(12) United States Patent  
Jang

(10) Patent No.: US 7,961,288 B2  
(45) Date of Patent: Jun. 14, 2011

(54) LIQUID CRYSTAL DISPLAY PANEL AND METHOD OF MANUFACTURING THE SAME

(75) Inventor: Min-sok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1169 days.

(21) Appl. No.: 11/517,239

(22) Filed: Sep. 7, 2006

(65) Prior Publication Data

US 2007/0165179 A1  Jul. 19, 2007

(30) Foreign Application Priority Data

Jan. 16, 2006  (KR) .................. 10-2006-0004506

(51) Int. Cl.
*G02F 1/1339* (2006.01)

(52) U.S. Cl. ........................................ 349/156; 349/155

(58) Field of Classification Search .................. 349/155, 349/156, 160

See application file for complete search history.

(56) References Cited

U.S. PATENT DOCUMENTS

| 6,067,144 | A  | * | 5/2000  | Murouchi    | 349/156 |
|-----------|----|---|---------|-------------|---------|
| 6,259,500 | B1 | * | 7/2001  | Kijima et al. | 349/113 |
| 2004/0012751 | A1 | * | 1/2004  | Iizuka et al. | 349/156 |
| 2004/0263766 | A1 | * | 12/2004 | Lee et al.    | 349/156 |
| 2005/0200784 | A1 | * | 9/2005  | Kume et al.   | 349/130 |

FOREIGN PATENT DOCUMENTS

| JP | 2002-156638    | 5/2002 |
|----|----------------|--------|
| KR | 1020040029561  | 4/2004 |
| KR | 1020050061859  | 6/2005 |

* cited by examiner

*Primary Examiner* — Michael H Caley  
(74) *Attorney, Agent, or Firm* — F. Chau & Associates, LLC

(57) ABSTRACT

A liquid crystal display panel includes a first substrate including a gate line, a data line crossing the gate line, and an insulating layer interposed between the gate line and the data line, defining a pixel, and a thin film transistor disposed at the pixel, a second substrate facing the first substrate, and a cell gap maintaining member disposed between the first substrate and the second substrate and including a connecting wall attached to either the first substrate or the second substrate, and a plurality of protrusions protruding from the connecting wall.

4 Claims, 21 Drawing Sheets

LIQUID CRYSTAL DISPLAY PANEL AND METHOD OF MANUFACTURING THE SAME

CROSS-REFERENCE TO RELATED PATENT APPLICATION

This application claims priority to Korean Patent Application No. 10-2006-0004506, filed on Jan. 16, 2006, the disclosure of which is herein incorporated by reference in its entirety.

BACKGROUND OF THE INVENTION

1. Technical Field

The present disclosure relates to a flat display panel and, more particularly, to a liquid crystal display panel and a method of manufacturing the same.

2. Discussion of Related Art

A liquid crystal display panel includes a first substrate, a second substrate, and a liquid crystal layer interposed between the two substrates. In the liquid crystal display panel, field-generating electrodes may be provided on the light-incident side of the first or second substrates. Alternatively, field-generating electrodes may be provided on both substrates.

A distance, that is, a cell gap, between the first and second substrates of a liquid crystal display panel may be uniformly maintained by a cell gap maintaining member. For example, a bead spacer can be used as the cell gap maintaining member, which may result in undesirable light leakage as a result of the random distribution of the beads in a space defined by the two substrates. Recently, a column or pillar-shaped spacer, which may be uniformly distributed throughout one of the two substrates, has been used as the cell gap maintaining member.

To maintain the cell gap of a conventional liquid crystal display panel using the column spacer, a liquid crystal dispensing process may be performed. According to the liquid crystal dispensing process, the first and second substrates are connected to each other after applying droplets of liquid crystals onto the first substrate or the second substrate. However, liquid crystal droplets may not be uniformly dispersed on the first or second substrate due to the column spacer, which may lower a dispensing process margin. To enhance a dispensing process margin, a method of reducing the dimensions of a column spacer has been suggested.

However, reducing the dimensions of the column spacer may result in a smear failure, which is cell gap non-uniformity due to an external stress applied to a liquid crystal display panel.

SUMMARY OF THE INVENTION

According to an exemplary embodiment of the present invention, there is provided a liquid crystal display panel including a first substrate including a gate line, a data line crossing the gate line, and an insulating layer interposed between the gate line and the data line, defining a pixel, and a thin film transistor disposed at the pixel, a second substrate facing the first substrate, and a cell gap maintaining member disposed between the first substrate and the second substrate and including a connecting wall attached to either the first substrate or the second substrate, and a plurality of protrusions protruding from the connecting wall.

According to an exemplary embodiment of the present invention, there is provided a method of manufacturing a liquid crystal display panel, the method including providing a first substrate including a gate line, a data line, and an insulating layer interposed therebetween, defining a pixel, the gate line and the data line intersecting each other, and a thin film transistor disposed at the pixel, and a second substrate facing the first substrate, forming a cell gap maintaining member including a connecting wall attached to one of the first substrate and the second substrate and a plurality of protrusions protruding from the connecting wall, and connecting the first substrate and the second substrate to each other.

BRIEF DESCRIPTION OF THE DRAWINGS

The present invention will become readily apparent to those of ordinary skill in the art when descriptions of exemplary embodiments thereof are read with reference to the accompanying drawings.

DESCRIPTION OF EXEMPLARY EMBODIMENTS

Figure 1:
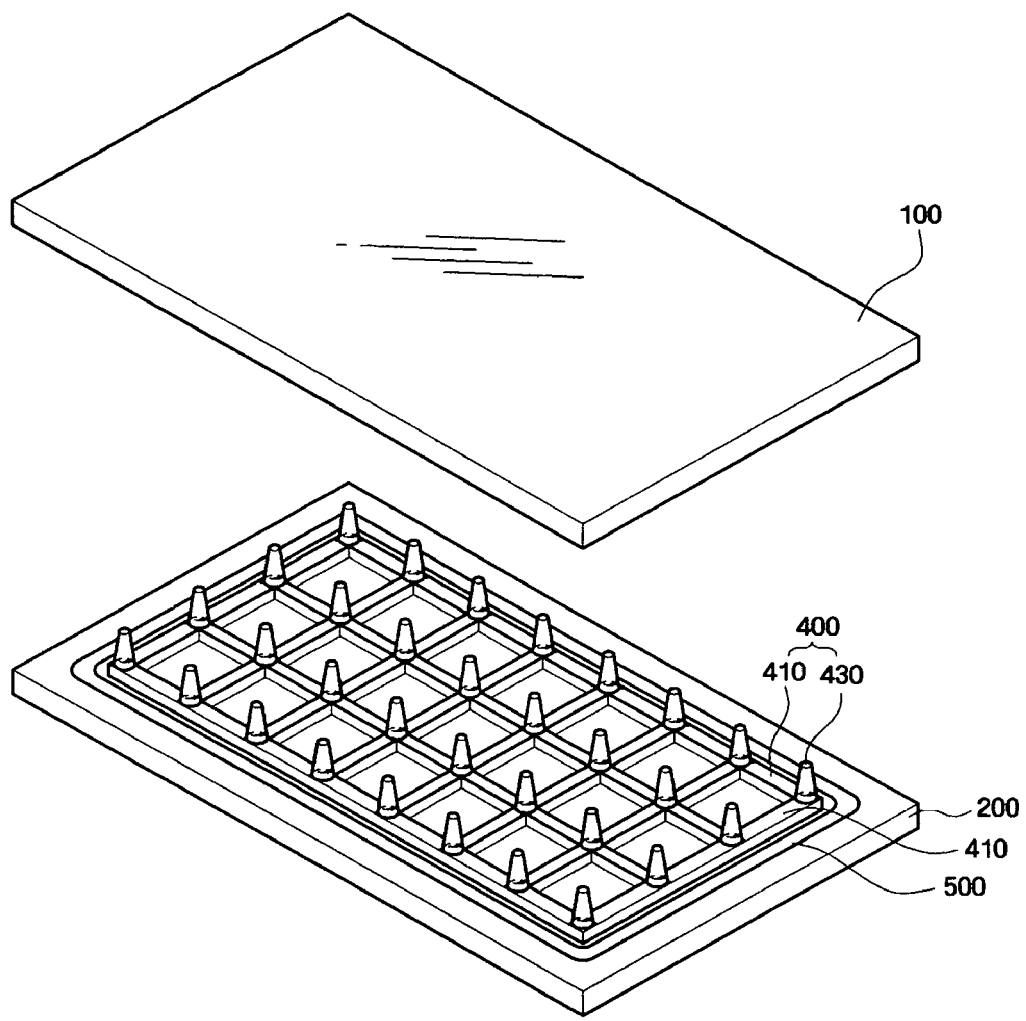
FIG. 1 is a schematic exploded perspective view illustrating a liquid crystal display panel according to an exemplary embodiment of the present invention.

Hereinafter, exemplary embodiments of the present invention will be described in detail with reference to the accompanying drawings. Like reference numerals refer to similar or identical elements throughout the description of the figures. In the drawings, the size and relative sizes of layers and regions may be exaggerated for clarity.

Hereinafter, a liquid crystal display panel according to an exemplary embodiment of the present invention will be described with reference to FIGS. 1 through 3.

Figure 2:
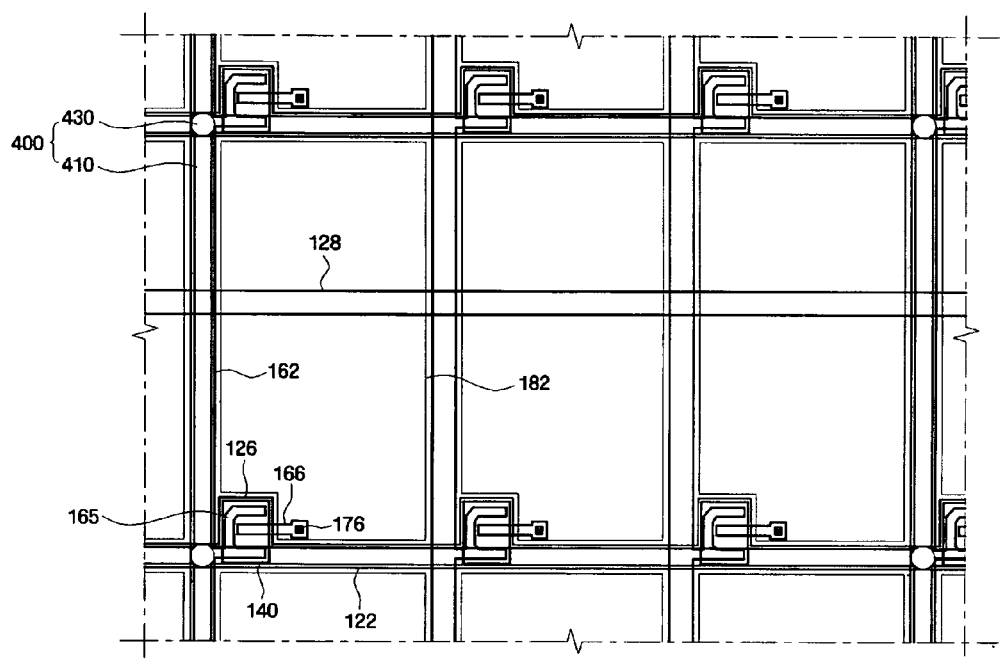
FIG. 2 is a plan view of the liquid crystal display panel according to an exemplary embodiment of the present invention.
Figure 3:
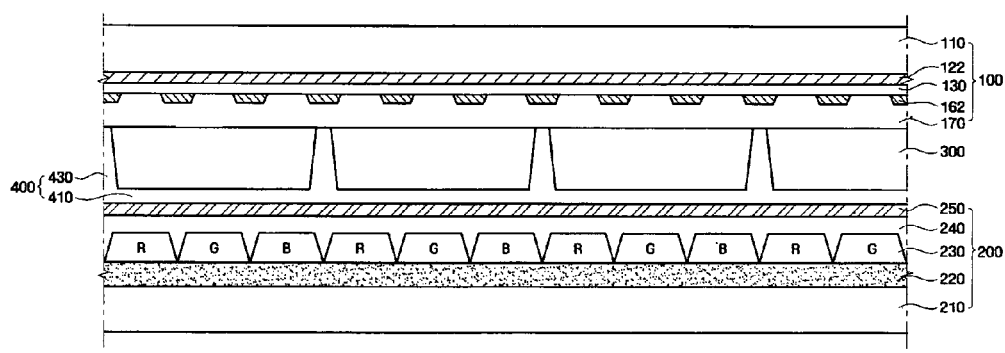
FIG. 3 is a longitudinal sectional view of the liquid crystal display panel according to an exemplary embodiment of the present invention.

FIG. 1 is a schematic exploded perspective view illustrating a liquid crystal display panel, FIG. 2 is a plan view of the liquid crystal display panel, and FIG. 3 is a longitudinal sectional view of the liquid crystal display panel of FIGS. 1 and 2, according to an exemplary embodiment of the present invention.

Referring to FIGS. 1 through 3, the liquid crystal display panel includes a first substrate 100, a second substrate 200 which is separated from and is arranged facing the first substrate 100, a liquid crystal layer 300 interposed between the first substrate 100 and the second substrate 200, and a cell gap maintaining member 400 uniformly maintaining a distance, that is, a cell gap, between the first substrate 100 and the second substrate 200.

The first substrate 100 includes a plurality of gate lines 122 which extend substantially parallel to one another in a first direction on a first insulating substrate 110, and a plurality of data lines 162 which extend substantially parallel to one another in a second direction.

Each of the plurality of gate lines 122 are arranged to cross, for example, substantially perpendicular to each of the data lines 162, defining a pixel, so that a thin film transistor and a pixel electrode 182 switched by the thin film transistor are provided at the pixel. A gate electrode 126 of the thin film transistor is branched from a corresponding one of the plurality of gate lines 122, and a source electrode 165 is branched from a corresponding one of the data lines 162. The source electrode 165 is electrically connected to the pixel electrode 182.

A storage electrode line 128 may be formed at a center portion of each pixel to form a storage capacitor Cst for maintaining an electrical signal applied to the liquid layer 300 for a given time. The storage electrode line 128 extends substantially parallel to the plurality of gate lines 122 to form a lower electrode of the storage capacitor Cst. In addition, the pixel electrode 182 of a region corresponding to the storage electrode line 128 forms an upper electrode of the storage capacitor Cst.

The plurality of gate lines 122, the storage electrode line 128 and the data lines 162 comprise an opaque conductive material, such as for example, aluminum (Al), copper (Cu), silver (Ag), molybdenum (Mo), chromium (Cr), titanium (Ti), tantalum (Ta), or an alloy thereof, and may be formed as a single layered structure or a multi-layered structure of two or more layers. The pixel electrode 182 comprises a transparent conductive material, such as for example, indium tin oxide (ITO) or indium zinc oxide (IZO).

A gate insulating layer 130, which comprises an inorganic material, such as silicon nitride (SiNx), is formed between each of the gate lines 122, the storage electrode line 128 and the data lines 162. In addition, a semiconductor layer 140, and ohmic contact layers (not shown) comprising n+ silicon are sequentially formed on the gate insulating layer 130 and between the data lines 162. The semiconductor layer 140 may be formed in various shapes, such as for example, an island shape, on the gate electrode 126, and the ohmic contact layers may be formed with two parts divided in opposite directions in view of the gate electrode 126.

In addition, a passivation layer 170 is formed between each of the data lines 162, the semiconductor layer 140, and the pixel electrode 182. For example, the passivation layer 170 comprises a photosensitive organic material having good flatness characteristics, a low dielectric insulating material such as a-Si:C:O and/or a-Si:O:F formed by plasma enhanced chemical vapor deposition (PECVD), or an inorganic insulator such as silicon nitride (SiNx). The passivation layer 170 is removed to form contact holes 176 electrically connected to the source electrode 165 and the pixel electrode 182.

The second substrate 200 includes a black matrix 220, a color filter layer 230, an overcoating layer 240 and a common electrode 250 on a second insulating substrate.

The black matrix 220, which is formed along the boundary of a pixel area to define each pixel, may comprise a photosensitive organic material with a black pigment added thereto, or formed as a single metal layer or a multi-layer structure of two or more metal layers, for example, comprising chromium, chromium oxide (CrO), or chromium nitride (CrNi). In addition, the black matrix 220 is lattice-shaped along the plurality of gate lines 122 and the data lines 162. Further, the black matrix 220 is also formed on top of the semiconductor layer 140.

The color filter layer 230, that is, a red color filter, a green color filter, and a blue color filter, are alternately arranged. Each of the respective color filters is surrounded by the black matrix 220. The color filter layer 230 may have an arrangement of a stripe type, a mosaic type, a delta type, or the like.

The overcoating layer 240 is formed on the color filter layer 230. The common electrode 250, together with the pixel electrode 182 of the first substrate 100, produces an electric field. The common electrode 250 may be formed on the overcoating layer 240 using a transparent conductive material such as ITO or IZO.

The first substrate 100 and the second substrate 200 may be sealed to each other with the liquid crystal layer 300 interposed therebetween. The plurality of gate lines 122 and the plurality of data lines 162 provided on the first substrate 100 are aligned to overlap with the black matrix 220 of the second substrate 200.

A backlight unit (not shown) is disposed at the first substrate 100. Light emitted from the backlight unit is transmitted through the first substrate 100, the liquid crystal layer 300, and the second substrate 200. When the light emitted from the backlight unit is blocked by one of the first substrate 100, the liquid crystal layer 300, or the second substrate 200, it cannot be transmitted through the liquid crystal display panel. The transmission or blockage of light in the liquid crystal layer 300 is determined by the electric field in the liquid crystal layer 300. Here, a region where light is blocked by either the first substrate 100 or the second substrate 200 regardless of the electric field in the liquid crystal layer 300 is defined as "light-shielding area" of the liquid crystal display panel. The light-shielding area of the liquid crystal display panel is the sum of a light-shielding area of the first substrate 100, such as the area in which the gate lines 122, data lines 162, and the storage electrode lines 128 are formed, and a light-shielding area of the second substrate 200, such as the area in which the black matrix 220 is formed. In addition, a region excluding the light-shielding area of the liquid crystal display panel, that is, a region transmitting light according to the electric field is defined as "transmitting region."

The cell gap maintaining member 400 is formed to maintain the cell gaps substantially uniformly between the first substrate 100 and the second substrate 200. The cell gap maintaining member 400 includes a connecting wall 410 with, for example, a lattice shape, and a plurality of protrusions 430 protruding from predetermined portions of the connecting wall 410. The cell gap maintaining member 400 is disposed to overlap with a light-shielding area defined by the first substrate 100 and the second substrate 200 to prevent a reduction in the aperture ratio of the liquid crystal display panel.

With respect to the cell gap maintaining member 400, the connecting wall 410 overlaps with lattice-shaped light-shielding areas defined by the gate lines 122 and the data lines 162 provided on the first substrate 100 and a black matrix 220 of the second substrate 200. The width of the connecting wall 410 may be less than or equal to a width of each of the light-shielding areas. The connecting wall 410 may be disposed at each of the light-shielding areas defined by the gate line 122 and the data lines 162, or at a light-shielding area defined by one of a plurality of gate lines 122 or one of a plurality of data lines 162.

The protrusions 430 protrude from the connecting wall 410 toward the first substrate 100. The height of the protrusions 430 corresponds to a subtraction of the height of the connecting wall 410 from the cell gap. The height ratio of the connecting wall 410 to the protrusions 430 may be in a ratio of about 1 to 0.1-0.9. The protrusions 430 may be randomly or uniformly distributed on the connecting wall 410. For example, the protrusions 430 may protrude from the connecting wall 410 in light-shielding areas corresponding to intersections between each of the gate lines 122 and each of the data lines 162.

In the liquid crystal display panel according to the exemplary embodiment of the present invention described in connection with FIGS. 1 through 3, an external stress applied to the liquid crystal display panel is uniformly dispersed throughout the connecting wall 410 of the cell gap maintaining member 400, and a smear failure, which may be caused to a surface of the first substrate 100 contacting with the protrusions 430 protruding from the connecting wall 410, may be reduced or prevented. For example, a bottom surface of the first substrate 100 contacting with the protrusions 430 can be prevented from collapsing. The number of the protrusions 430 comprising the cell gap maintaining member 400 of the liquid crystal display panel according to the exemplary embodiment of the present invention described in connection with FIGS. 1 through 3 is smaller than the number of the column spacers used as the cell gap maintaining members in a conventional liquid crystal display panel, and the dimension of the cell gap maintaining member 400 is reduced, and a liquid crystal dispensing margin may be enhanced.

An alignment film (not shown) may be disposed on each of the first substrate 100 and the second substrate 200 to which the cell gap maintaining member 400 is attached.

A seal line 500 is formed along peripheral edges of the first substrate 100 and the second substrate 200 to couple the first substrate 100 and the second substrate 200. The seal line 500 may include a UV-curable resin such as for example, an acrylic resin. The seal line 500 may further include a thermally curable resin, such as for example, an epoxy resin, an amine-based curing agent, a filler such as alumina or powder, and a spacer.

The liquid crystal layer 300 is disposed in a space defined by the first substrate 100, the second substrate 200, and the seal line 500. The orientations of liquid crystal molecules of the liquid crystal layer 300 are controlled according to a voltage difference between a pixel electrode 182 and a common electrode 250.

As described above, a liquid crystal display panel according to the exemplary embodiment of the present invention described in connection with FIGS. 1 through 3 includes a cell gap maintaining member comprising a lattice-shaped connecting wall and a plurality of protrusions protruding from the connecting wall, and a liquid crystal dispensing margin can be improved, and a smear failure, which may be caused due to a substrate contacting with the cell gap maintaining member, can be avoided.

Figure 4:
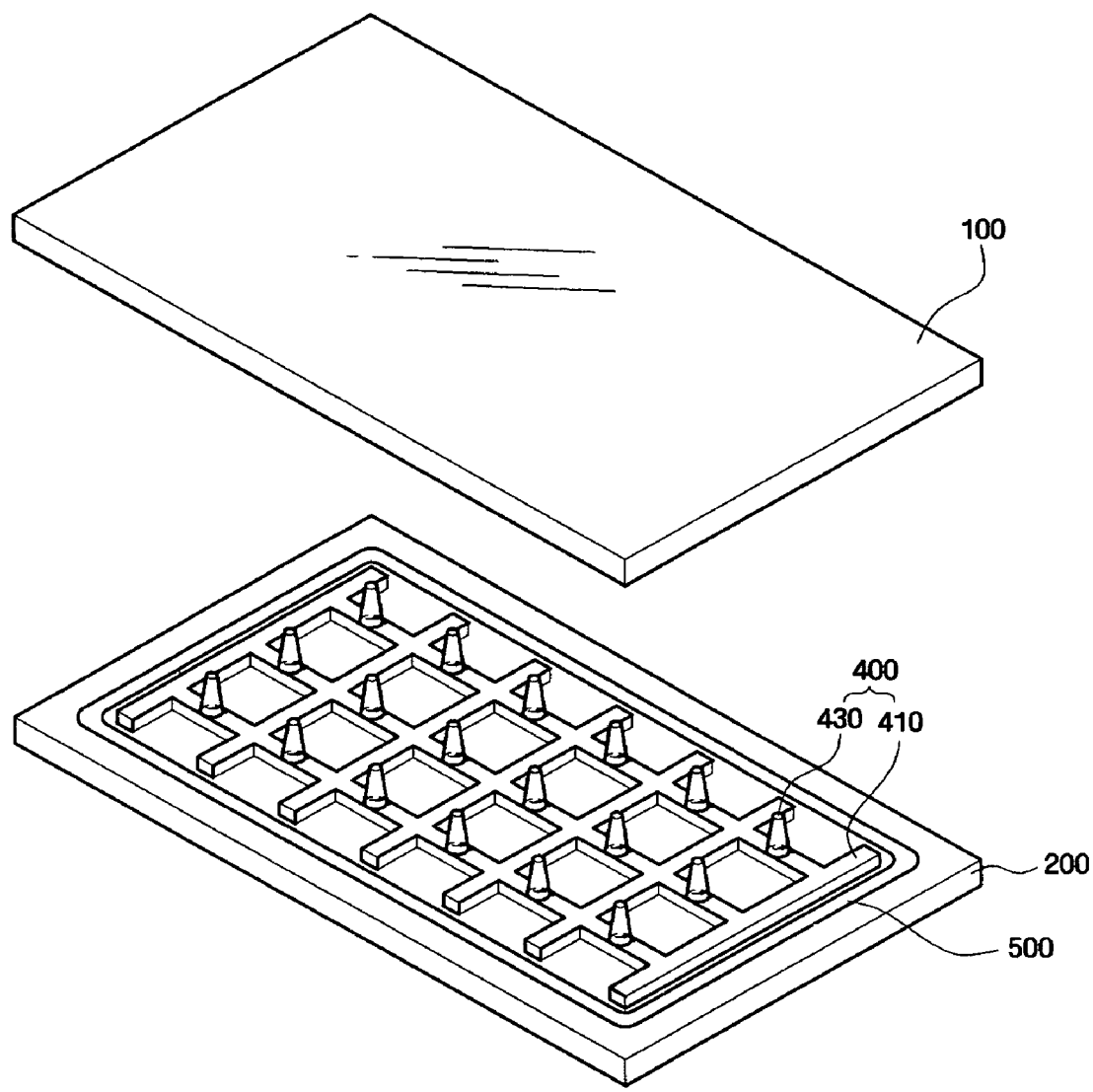
FIG. 4 is a schematic exploded perspective view illustrating a liquid crystal display panel according to an exemplary embodiment of the present invention.

Hereinafter, a liquid crystal display panel according to an exemplary embodiment of the present invention will be described with reference to FIGS. 4 through 6. FIG. 4 is a schematic exploded perspective view illustrating a liquid crystal display panel, FIG. 5 is a plan view of the liquid crystal display panel, and FIG. 6 is a longitudinal sectional view of the liquid crystal display panel according to an exemplary embodiment of the present invention.

Figure 5:
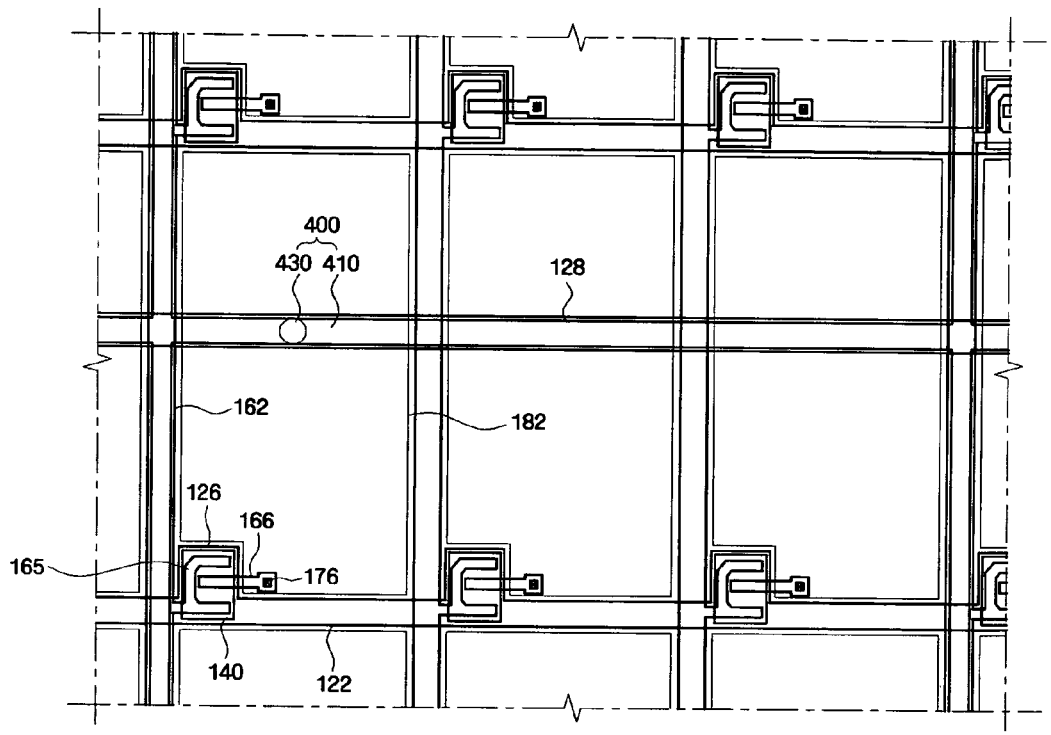
FIG. 5 is a plan view of the liquid crystal display panel according to an exemplary embodiment of the present invention.
Figure 6:
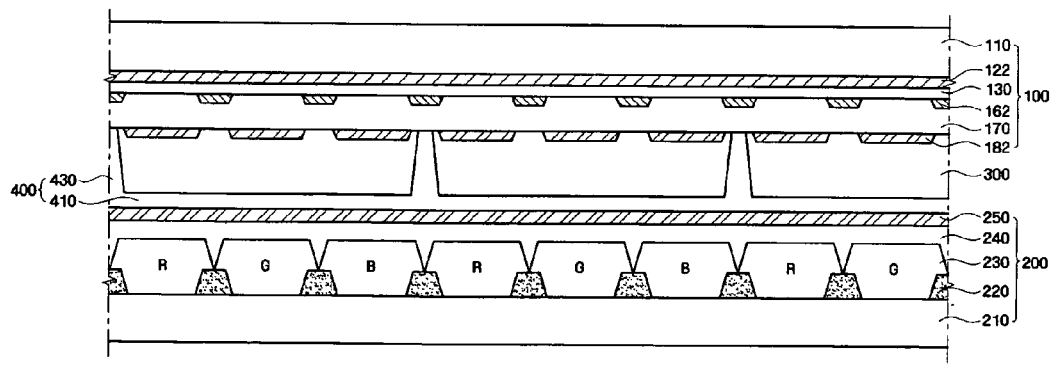
FIG. 6 is a longitudinal sectional view of the liquid crystal display panel according to an exemplary embodiment of the present invention.

In the liquid crystal display panel shown in FIGS. 4 through 6, a cell gap maintaining member 400 includes a connecting wall 410 and a plurality of protrusions 430 protruding from the connecting wall 410. The connecting wall 410 of the cell gap maintaining member 400 substantially overlaps with lattice-shaped light-shielding areas defined by a storage electrode line 128 and data lines 162 provided on a first substrate 100, wherein a width of the connecting wall 410 is less than or equal to a width of each of the light-shielding areas. The connecting wall 410 may be disposed at each light-shielding area defined by the storage electrode line 128 and the data lines 162, or at the light-shielding area defined by one of a plurality of storage electrode lines 128 or one of a plurality of data lines 162.

The protrusions 430 protrude from the connecting wall 410 toward the first substrate 100. The protrusions 430 may be randomly or uniformly distributed on the connecting wall 410. For example, the protrusions 430 may protrude from the connecting wall 410 in light-shielding areas defined by the storage electrode lines 128.

The liquid crystal display panel shown in FIGS. 4 through 6 includes structures shown in FIGS. 1 through 3, except for the a different arrangement of a cell gap maintaining member, and further description thereof will be omitted in the interests of clarity and simplicity.

According to the above-described liquid crystal display panel of the exemplary embodiment of the present invention described in connection with FIGS. 4 through 6, a liquid crystal dispensing margin can be enhanced, and a smear failure, which may be caused to a substrate contacting with a cell gap maintaining member, can be avoided.

Figure 7:
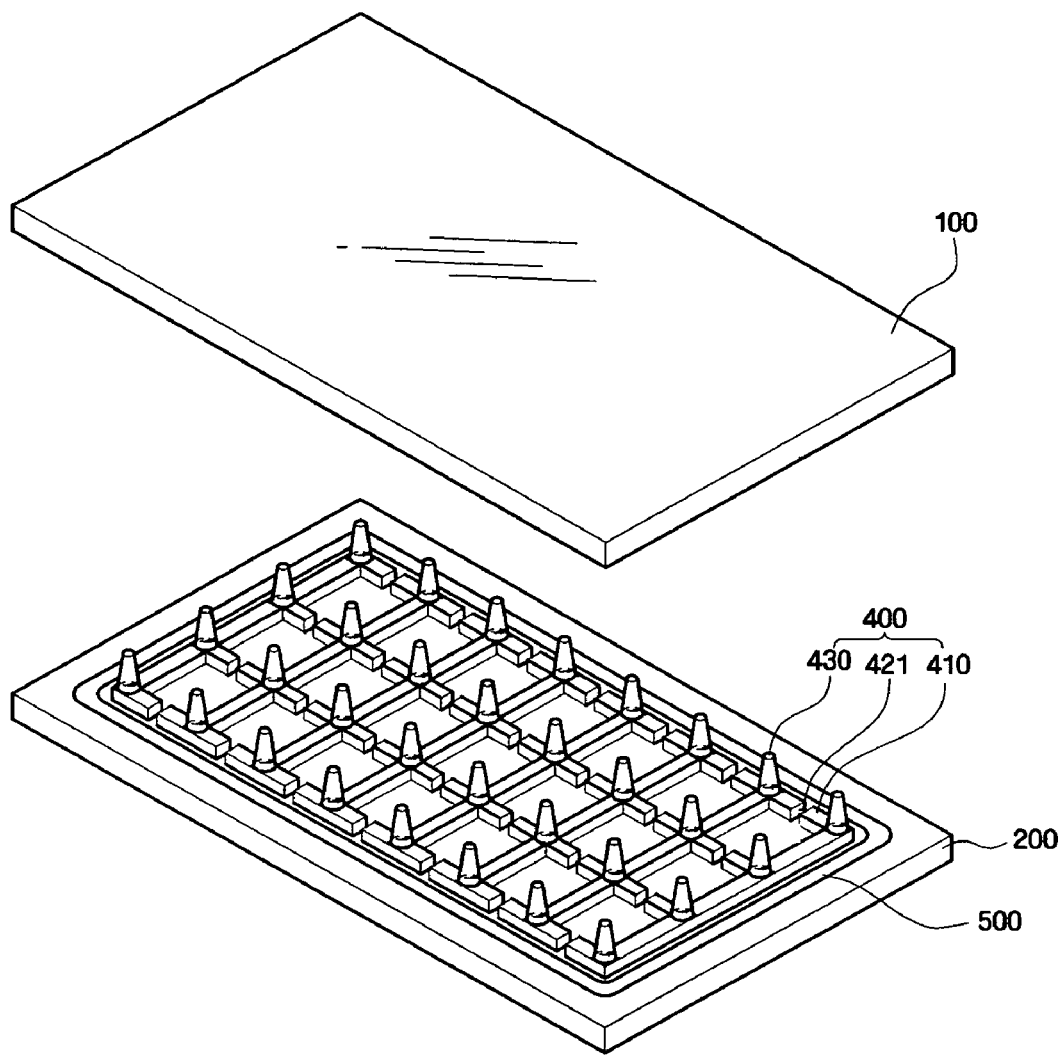
FIG. 7 is a schematic exploded perspective view illustrating a liquid crystal display panel according to an exemplary embodiment of the present invention.

Hereinafter, a liquid crystal display panel according to an exemplary embodiment of the present invention will be described with reference to FIGS. 7 through 9. FIG. 7 is a schematic exploded perspective view illustrating a liquid crystal display panel, FIG. 8 is a plan view of the liquid crystal display panel, and FIG. 9 is a longitudinal sectional view of the liquid crystal display panel according to an exemplary embodiment of the present invention.

Figure 8:
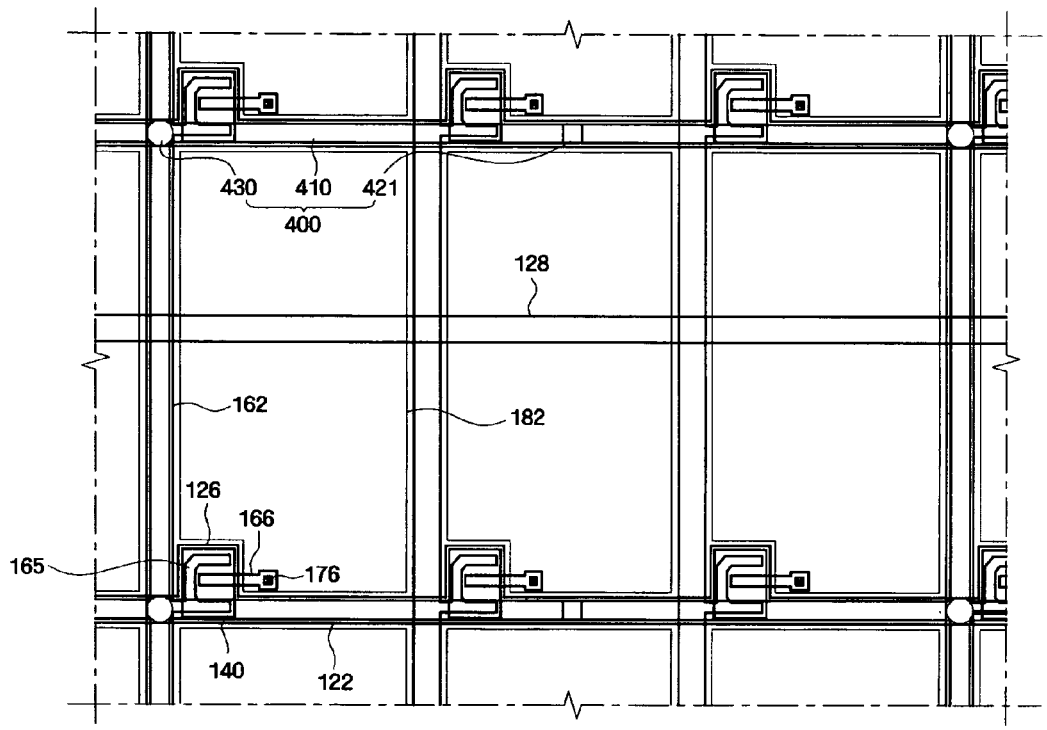
FIG. 8 is a plan view of the liquid crystal display panel according to an exemplary embodiment of the present invention.
Figure 9:
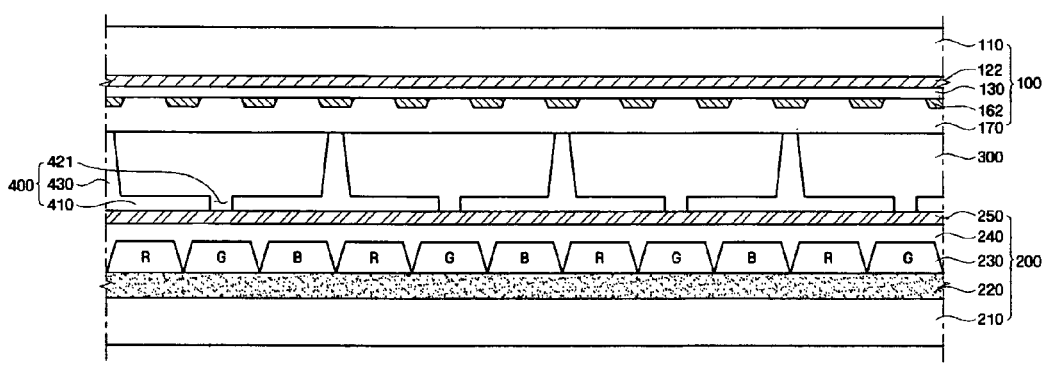
FIG. 9 is a longitudinal sectional view of the liquid crystal display panel according to an exemplary embodiment of the present invention.

Referring to FIGS. 7 through 9, the liquid crystal display panel includes a cell gap maintaining member 400. The cell gap maintaining member 400 includes a connecting wall 410, a plurality of grooves 421 which are formed to a predetermined depth in the connecting wall 410, and a plurality of protrusions 430 protruding from the connecting wall 410. A depth of each of the grooves 421 may be substantially the same as a height of the connecting wall 410.

The grooves 421 formed in the connecting wall 410 of the cell gap maintaining member 400 serve as flow channels of liquid crystals toward a seal line 500 during a liquid crystal dispensing process. The width, number, and arrangement of the grooves 421 in the connecting wall 410 of the cell gap maintaining member 400 may be determined by the flow rate of liquid crystals. That is, the flow rate of liquid crystals toward the seal line 500 can be controlled by adjusting the width, number, and arrangement of the grooves 421, and contact of liquid crystals with an uncured seal line can be prevented, thereby preventing a chemical reaction between the liquid crystals and the uncured seal line. Moreover, contamination of the liquid crystals due to the contact of the liquid crystals with the uncured seal line, and a defect due to a break-down of the seal line 500, can be avoided.

The liquid crystal display panel according to the exemplary embodiment of the present invention described in connection with FIGS. 7 through 9 is substantially the same as that of the exemplary embodiment of the present invention described in connection with FIGS. 1 through 3 except that a cell gap maintaining member includes grooves, and further description of the same or similar structures will be omitted. The grooves 421 of the cell gap maintaining member 400 can also be applied to a connecting wall of a cell gap maintaining member of the liquid crystal display panel shown in FIGS. 4 through 6.

In a liquid crystal display panel according to the exemplary embodiment of the present invention described in connection with FIGS. 7 through 9, a liquid crystal dispensing margin can be enhanced, and a smear failure, which may be caused due to a substrate contacting with the cell gap maintaining member 400, can be avoided. In addition, a flow rate of liquid crystals can be controlled, for example, by grooves 421 formed in the connecting wall 410 of the cell gap maintaining member 400.

Figure 10:
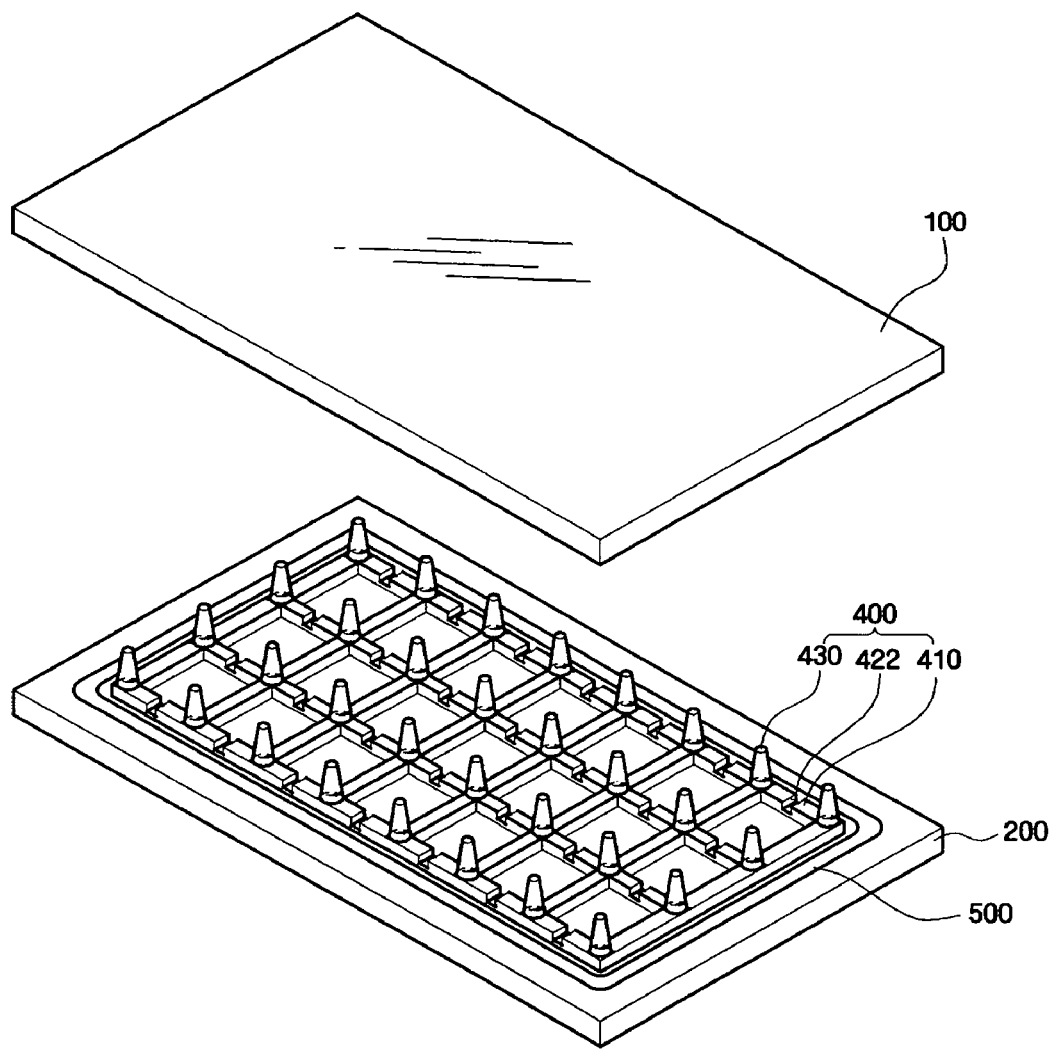
FIG. 10 is a schematic exploded perspective view illustrating a liquid crystal display panel according to an exemplary embodiment of the present invention.

Hereinafter, a liquid crystal display panel according to an exemplary embodiment of the present invention will be described with reference to FIGS. 10 through 12. FIG. 10 is a schematic exploded perspective view illustrating a liquid crystal display panel, FIG. 11 is a plan view of the liquid crystal display panel, and FIG. 12 is a longitudinal sectional view of the liquid crystal display panel according to an exemplary embodiment of the present invention.

Figure 11:
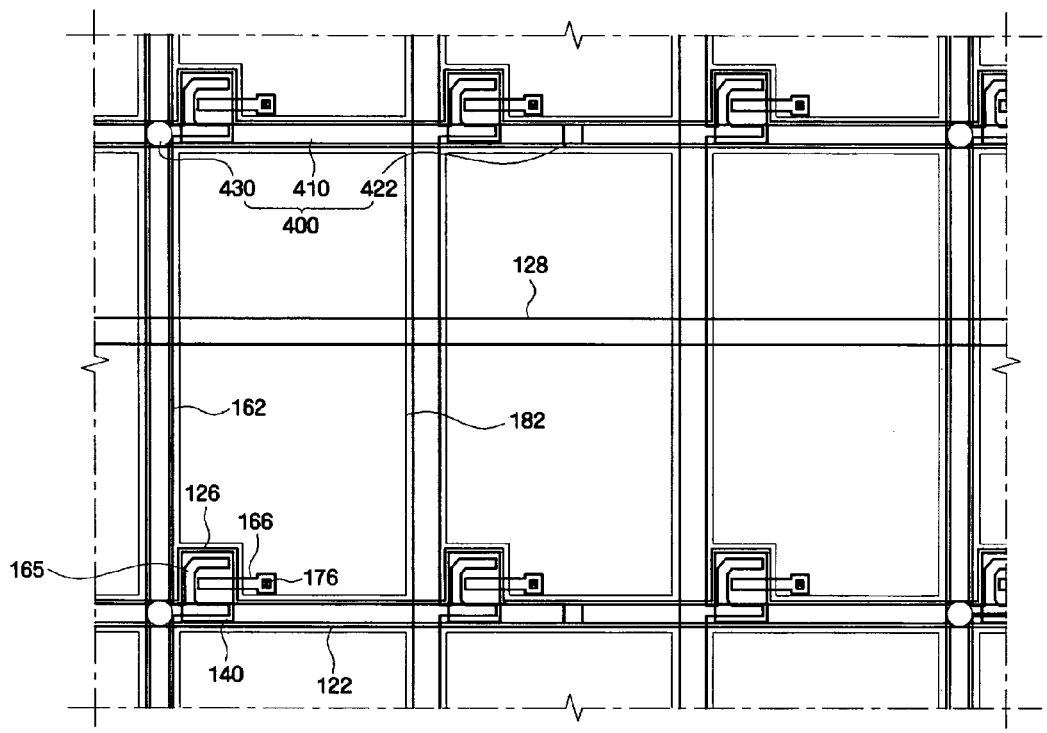
FIG. 11 is a plan view of the liquid crystal display panel according to an exemplary embodiment of the present invention.
Figure 12:
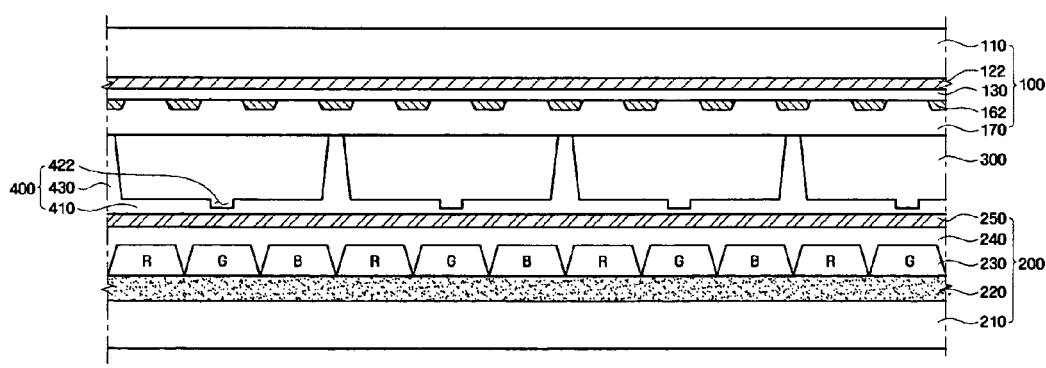
FIG. 12 is a longitudinal sectional view of the liquid crystal display panel according to an exemplary embodiment of the present invention.

With respect to the liquid crystal display panel according to an exemplary embodiment of the present invention, referring to FIGS. 10 through 12, a cell gap maintaining member 400 includes a connecting wall 410, a plurality of grooves 422 that are formed to a predetermined depth in the connecting wall 410, and a plurality of protrusions 430 protruding from the connecting wall 410. The predetermined depth of each of the grooves 422 is smaller than a height of the connecting wall 410. The predetermined depth of each of the grooves 422 can be varied according to the flow rate of liquid crystals provided that it is smaller than the height of the connecting wall 410. In an exemplary embodiment of the present invention, the depth of the grooves 422 is smaller than the height of the connecting wall 410, the connecting wall 410 of the cell gap maintaining member 400 can form a fully connected structure, and an external stress applied to the cell gap maintaining member 400 can be uniformly dispersed throughout the connecting wall 410. In addition, since the flow rate of liquid crystals toward a seal line 500 can be controlled by the grooves 422, a contact of the liquid crystal with an uncured seal line can be prevented, and contamination of liquid crystals and a defect due to a break-down of the seal line 500 can be reduced or prevented.

The number and arrangement of the grooves 422 in the connecting wall 410 of the cell gap maintaining member 400 may be varied. For example, the number of the grooves 422 can be adjusted according to the flow rate of liquid crystals. The grooves 422 may be arranged randomly or uniformly.

The liquid crystal display panel shown in FIGS. 10 through 12 includes structures shown in FIGS. 1 through 3 and FIGS. 7 through 9, except that the cell gap maintaining member 400 includes the grooves 422 with a smaller depth than a height of the connecting wall 410, and further description of the structures in common will be omitted.

The grooves 422 of the cell gap maintaining member 400 can also be applied to the connecting wall of the cell gap maintaining member of the liquid crystal display panel shown in FIGS. 4 through 6.

According to the above-described liquid crystal display panel of the exemplary embodiment of the present invention described in connection with FIGS. 10 through 12, a liquid crystal dispensing margin can be enhanced, a smear failure, which may be caused to a substrate contacting with a cell gap maintaining member, can be avoided, and a flow rate of liquid crystals during the dispensing process can be controlled.

Figure 13:
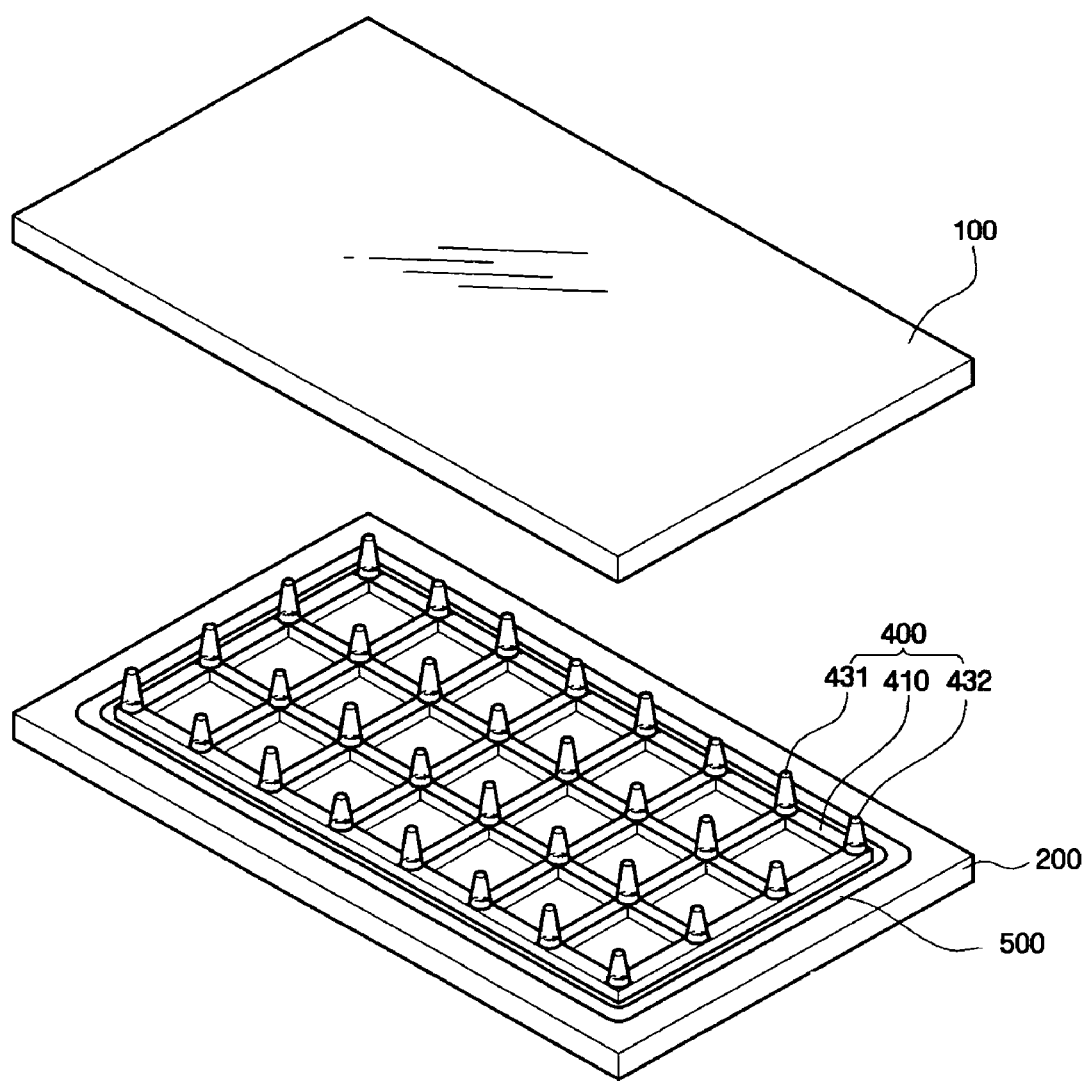
FIG. 13 is a schematic exploded perspective view illustrating a liquid crystal display panel according to an exemplary embodiment of the present invention.

Hereinafter, a liquid crystal display panel according to an exemplary embodiment of the present invention will be described with reference to FIGS. 13 through 15. FIG. 13 is a schematic exploded perspective view illustrating a liquid crystal display panel, FIG. 14 is a plan view of the liquid crystal display panel, and FIG. 15 is a longitudinal sectional view of the liquid crystal display panel according to an exemplary embodiment of the present invention.

Figure 14:
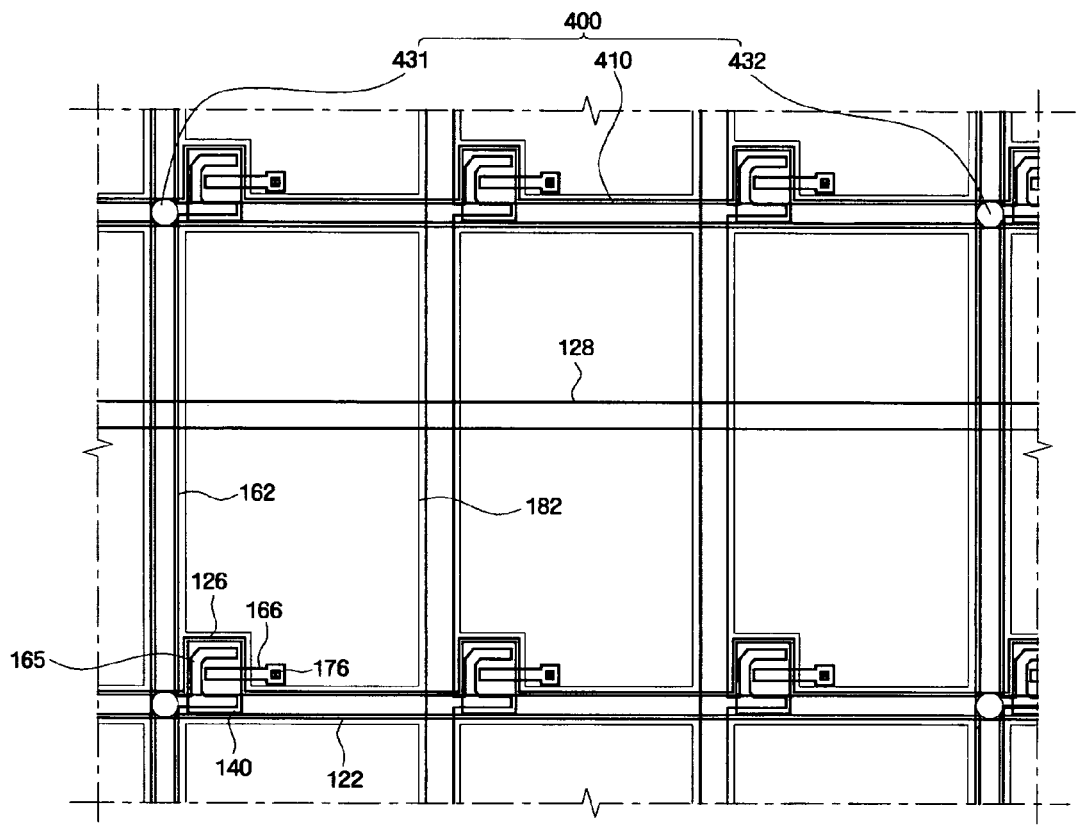
FIG. 14 is a plan view of the liquid crystal display panel according to an exemplary embodiment of the present invention.
Figure 15:
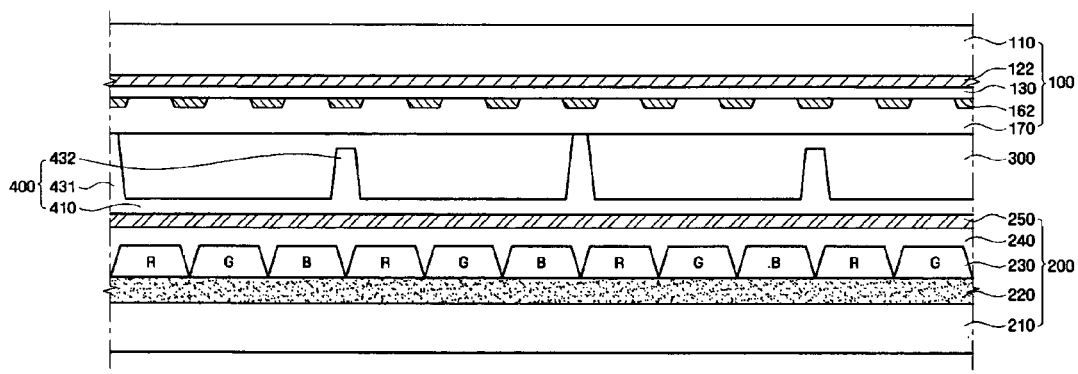
FIG. 15 is a longitudinal sectional view of the liquid crystal display panel according to an exemplary embodiment of the present invention.

The liquid crystal display panel according to an exemplary embodiment of the present invention, referring to FIGS. 13 through 15, a cell gap maintaining member 400 includes a lattice-shaped connecting wall 410, and a plurality of first and second protrusions 431 and 432 which protrude from the connecting wall 410 and have different heights. For example, the height of the first protrusions 431 may correspond to a subtraction of the height of the connecting wall 410 from a cell gap, and the height of the second protrusions 432 is smaller than that of the first protrusions 431.

For example, the height ratio of the first protrusions 431 to the second protrusions 432 may be in a ratio of about 1 to 0.7-0.9. However, the height ratio of the first protrusions 431 to the second protrusions 432 can be varied provided that, when an external stress is applied to the liquid crystal display panel, the second protrusions 432 may contact a first substrate 100. The first and second protrusions 431 and 432 may be arranged randomly or uniformly. For example, the first and second protrusions 431 and 432 may protrude from the connecting wall 410 in light-shielding areas corresponding to intersections between gate lines 122 and data lines 162.

In the above-described liquid crystal display panel according to the exemplary embodiment of the present invention described in connection with FIGS. 13 through 15, an external stress applied to the liquid crystal display panel can be uniformly dispersed throughout the connecting wall 410 of the cell gap maintaining member 400, and the number of protrusions of a cell gap maintaining member 400 contacting the first substrate is less than the number of column spacers used as cell gap maintaining members in a conventional liquid crystal display panel, and the dimension of the cell gap maintaining member 400 is reduced, and a liquid crystal dispensing margin may be enhanced. In addition, since second protrusions of the cell gap maintaining member 400 can may contact the first substrate under an applied stress to the liquid crystal display panel, the applied stress can be uniformly dispersed throughout the cell gap maintaining member 400, suppressing a smear failure, which may be caused to the first substrate contacting with the cell gap maintaining member 400.

The liquid crystal display panel according to the exemplary embodiment of the present invention described in connection with FIGS. 13 through 15 is substantially the same as that of the embodiment of the present invention described in connection with FIGS. 1 through 3 except that the cell gap maintaining member 400 includes first and second protrusions 431, 432 of different heights, and further description thereof will be omitted.

In the liquid crystal display panel according to the exemplary embodiment of the present invention described in connection with FIGS. 13 through 15, a liquid crystal dispensing margin can be enhanced, and a smear failure, which may be caused to a substrate contacting with a cell gap maintaining member 400, can be avoided.

Figure 16:
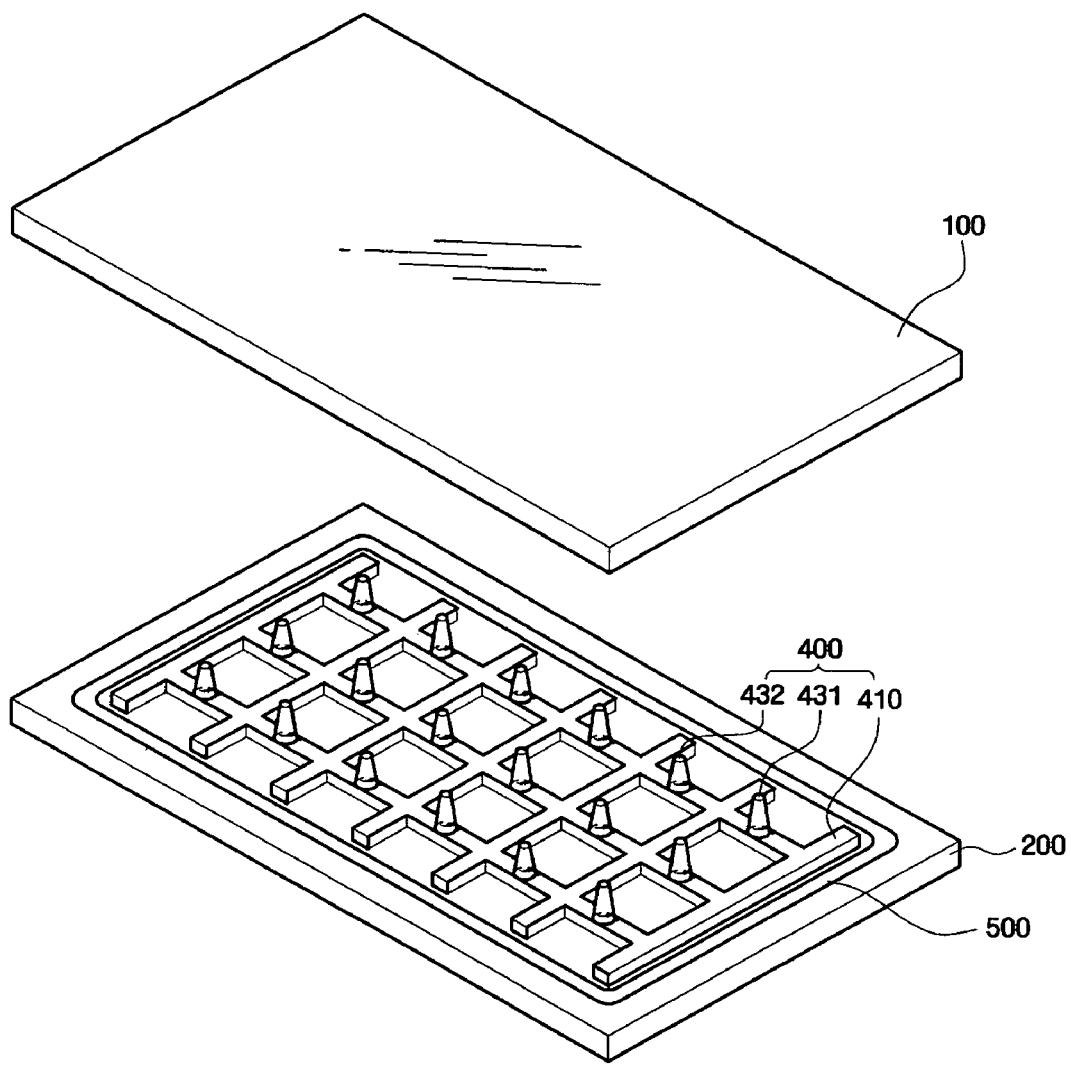
FIG. 16 is a schematic exploded perspective view illustrating a liquid crystal display panel according to an exemplary embodiment of the present invention.

Hereinafter, a liquid crystal display panel according to an exemplary embodiment of the present invention will be described with reference to FIGS. 16 through 18. FIG. 16 is a schematic exploded perspective view illustrating a liquid crystal display panel, FIG. 17 is a plan view of the liquid crystal display panel, and FIG. 18 is a longitudinal sectional view of the liquid crystal display panel according to an exemplary embodiment of the present invention.

Figure 17:
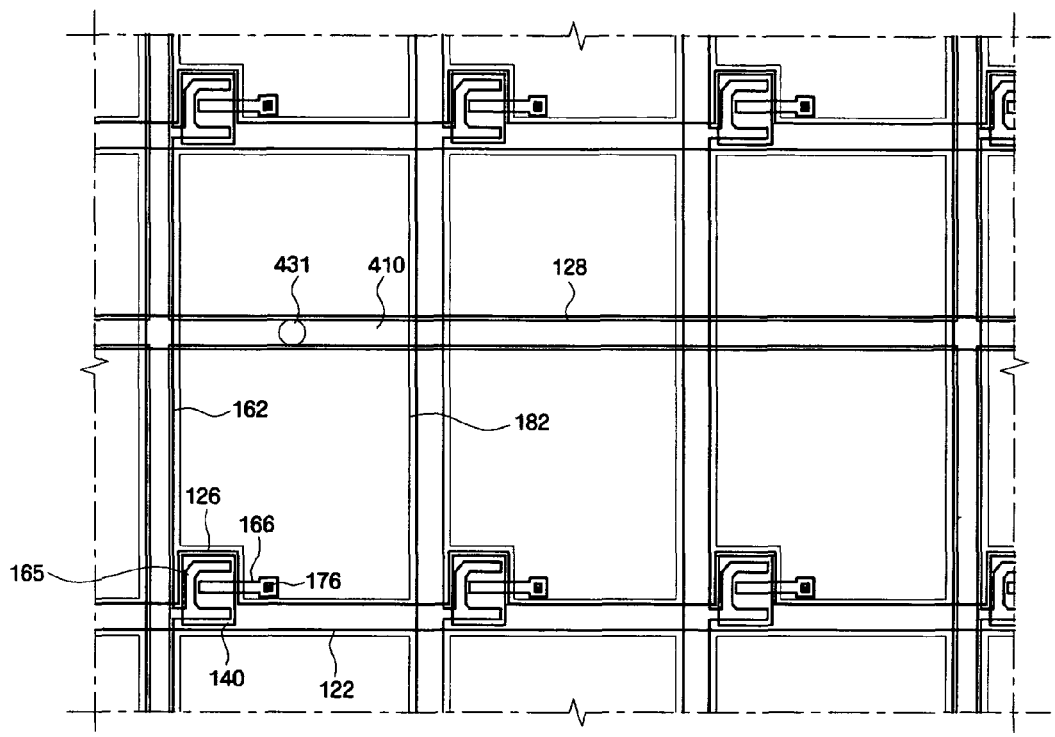
FIG. 17 is a plan view of the liquid crystal display panel according to an exemplary embodiment of the present invention.
Figure 18:
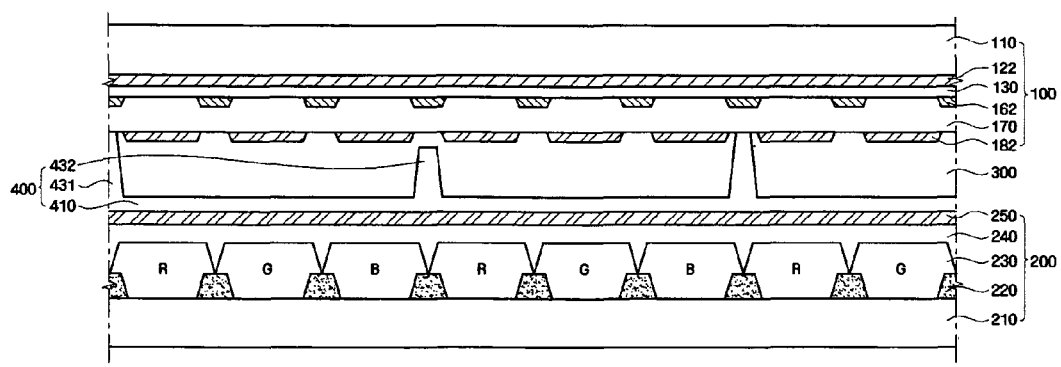
FIG. 18 is a longitudinal sectional view of the liquid crystal display panel according to an exemplary embodiment of the present invention.

In the liquid crystal display panel shown in FIGS. 16 through 18, a cell gap maintaining member 400 includes a connecting wall 410, and a plurality of first and second protrusions 431 and 432 that protrude from the connecting wall 410 and have different heights. The connecting wall 410 of the cell gap maintaining member 400 has substantially the same lattice shape as light-shielding areas defined by storage electrode lines 128 and data lines 162 provided on a first substrate 100. The width of the connecting wall 410 may be less than or equal to a width of the light-shielding areas.

The first and second protrusions 431 and 432 protrude from the connecting wall 410 toward the first substrate 100. The first and second protrusions 431 and 432 may be arranged randomly or uniformly. For example, the first and second protrusions 431 and 432 may alternately protrude from the connecting wall 410 in light-shielding areas defined by the storage electrode lines 128.

In the liquid crystal display panel according to the exemplary embodiment of the present invention described in connection with FIGS. 16 through 18, a liquid crystal dispensing margin can be enhanced, and a smear failure that may be caused due to a substrate contacting with a cell gap maintaining member 400, can be avoided.

Figure 19:
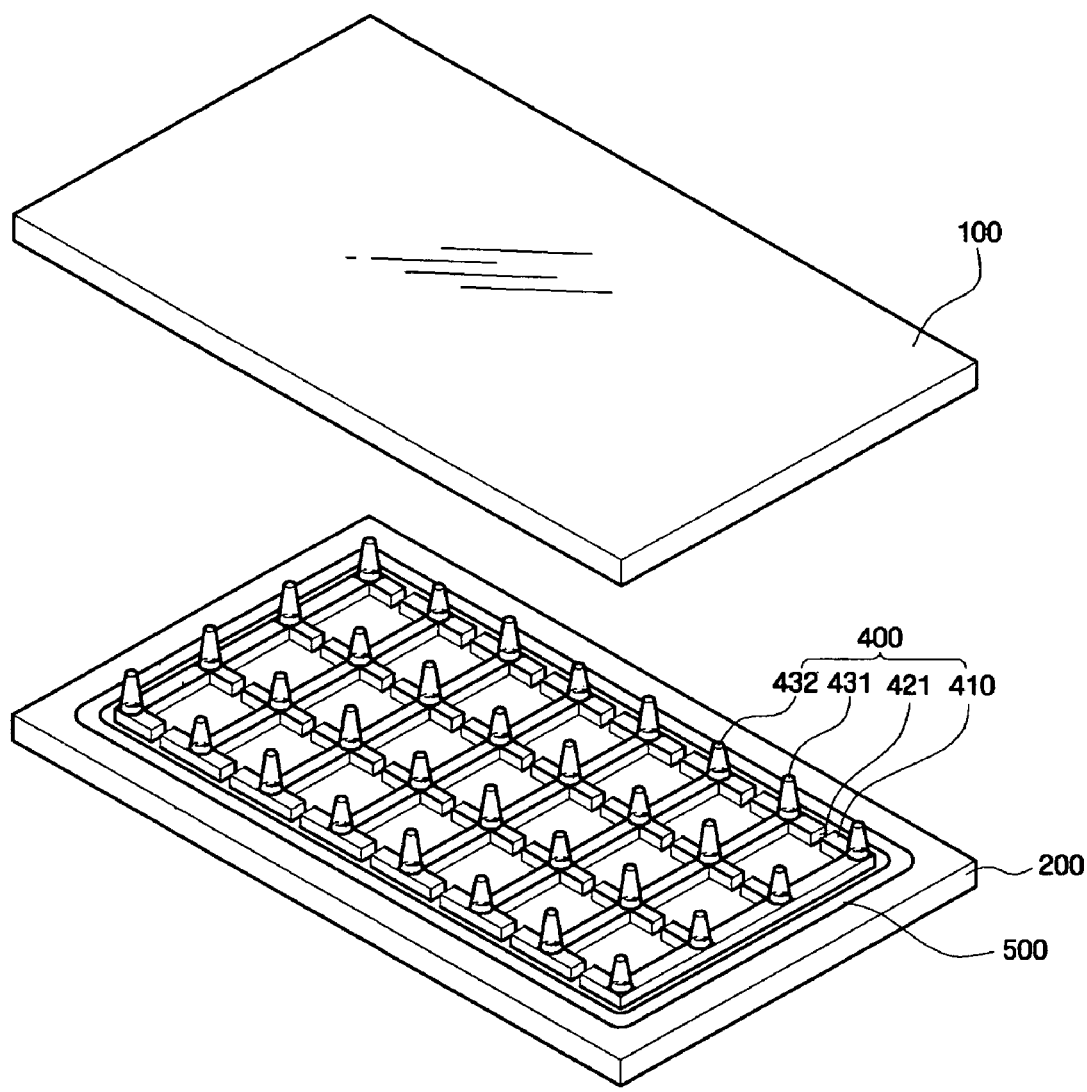
FIG. 19 is a schematic exploded perspective view illustrating a liquid crystal display panel according to an exemplary embodiment of the present invention.

Hereinafter, a liquid crystal display panel according to an exemplary embodiment of the present invention will be described with reference to FIGS. 19 through 21. FIG. 19 is a schematic exploded perspective view illustrating a liquid crystal display panel, FIG. 20 is a plan view of the liquid crystal display panel, and FIG. 21 is a longitudinal sectional view of the liquid crystal display panel according to an exemplary embodiment of the present invention.

Figure 20:
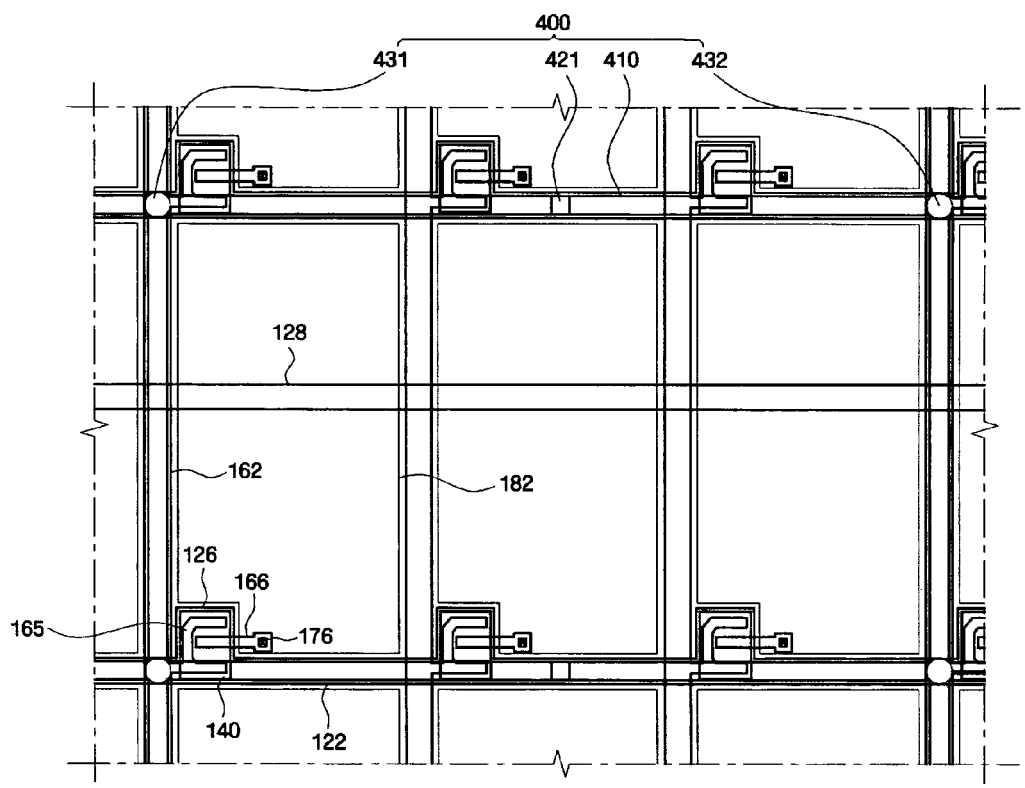
FIG. 20 is a plan view of the liquid crystal display panel according to an exemplary embodiment of the present invention.
Figure 21:
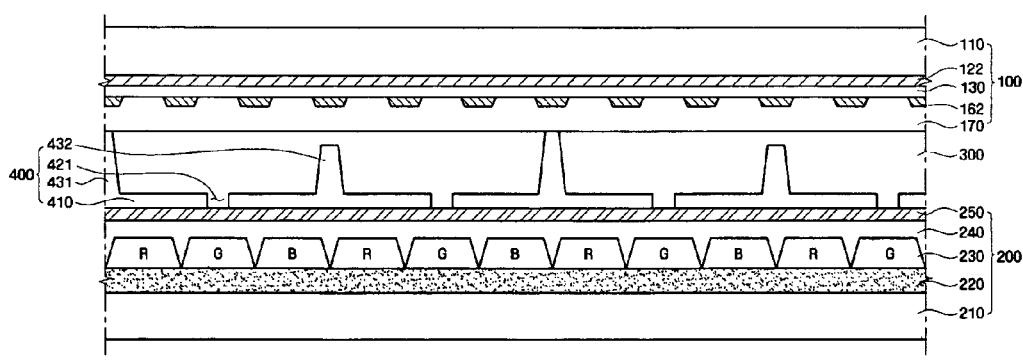
FIG. 21 is a longitudinal sectional view of the liquid crystal display panel according to an exemplary embodiment of the present invention.

With respect to the liquid crystal display panel according to an exemplary embodiment of the present invention, referring to FIGS. 19 through 21, a cell gap maintaining member 400 includes a connecting wall 410, a plurality of grooves 421 that are formed to a predetermined depth in the connecting wall 410, and a plurality of protrusions 431 and 432 that protrude from the connecting wall 410 and have different heights. A depth of each of the grooves 421 may be substantially the same as a height of the connecting wall 410.

The width, number, and arrangement of the grooves 421 in the connecting wall 410 of the cell gap maintaining member 400 can be varied. For example, the width and number of the grooves 421 can be adjusted according to the flow rate of liquid crystals. The grooves 421 may be arranged randomly or uniformly.

The liquid crystal display panel shown in FIGS. 19 through 21 includes structures shown in FIGS. 1 through 3 and FIGS. 7 through 9, except that the cell gap maintaining member 400 further includes grooves 421 and first and second protrusions 431 and 432 of different heights, and further description of the structures in common will be omitted. The grooves of the seventh exemplary embodiment of the present invention can also be applied to the connecting wall 410 of the cell gap maintaining member 400 of the liquid crystal display panel according to the exemplary embodiment of the present invention shown in FIGS. 16 through 18.

In the liquid crystal display panel according to the exemplary embodiment of the present invention described in connection with FIGS. 19 through 21, a liquid crystal dispensing margin can be enhanced, and a smear failure, which may be caused to a substrate contacting with the cell gap maintaining member 400, can be avoided.

Figure 22:
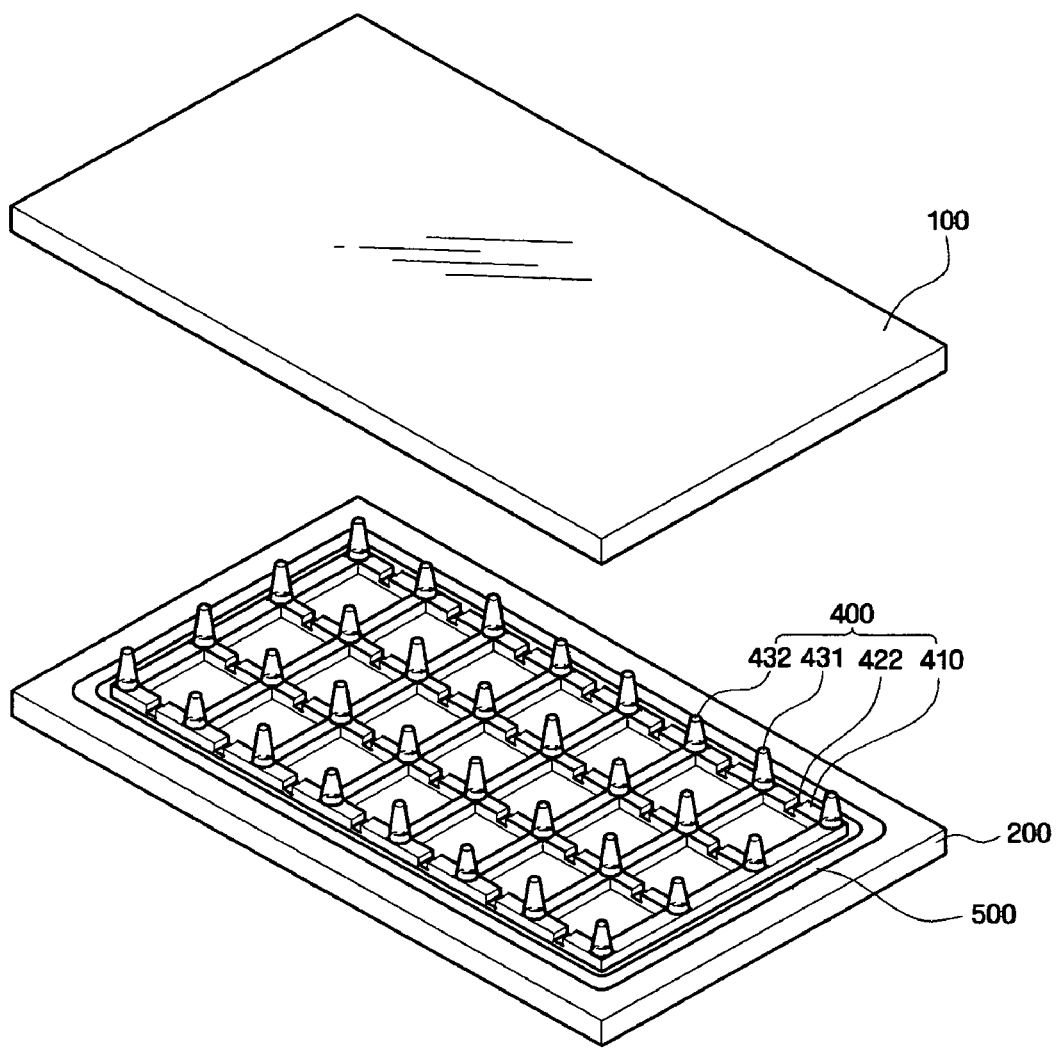
FIG. 22 is a schematic exploded perspective view illustrating a liquid crystal display panel according to an exemplary embodiment of the present invention.

Hereinafter, a liquid crystal display panel according to an exemplary embodiment of the present invention will be described with reference to FIGS. 22 through 24. FIG. 22 is a schematic exploded perspective view illustrating a liquid crystal display panel, FIG. 23 is a plan view of the liquid crystal display panel, and FIG. 24 is a longitudinal sectional view of the liquid crystal display panel according to an exemplary embodiment of the present invention.

Figure 23:
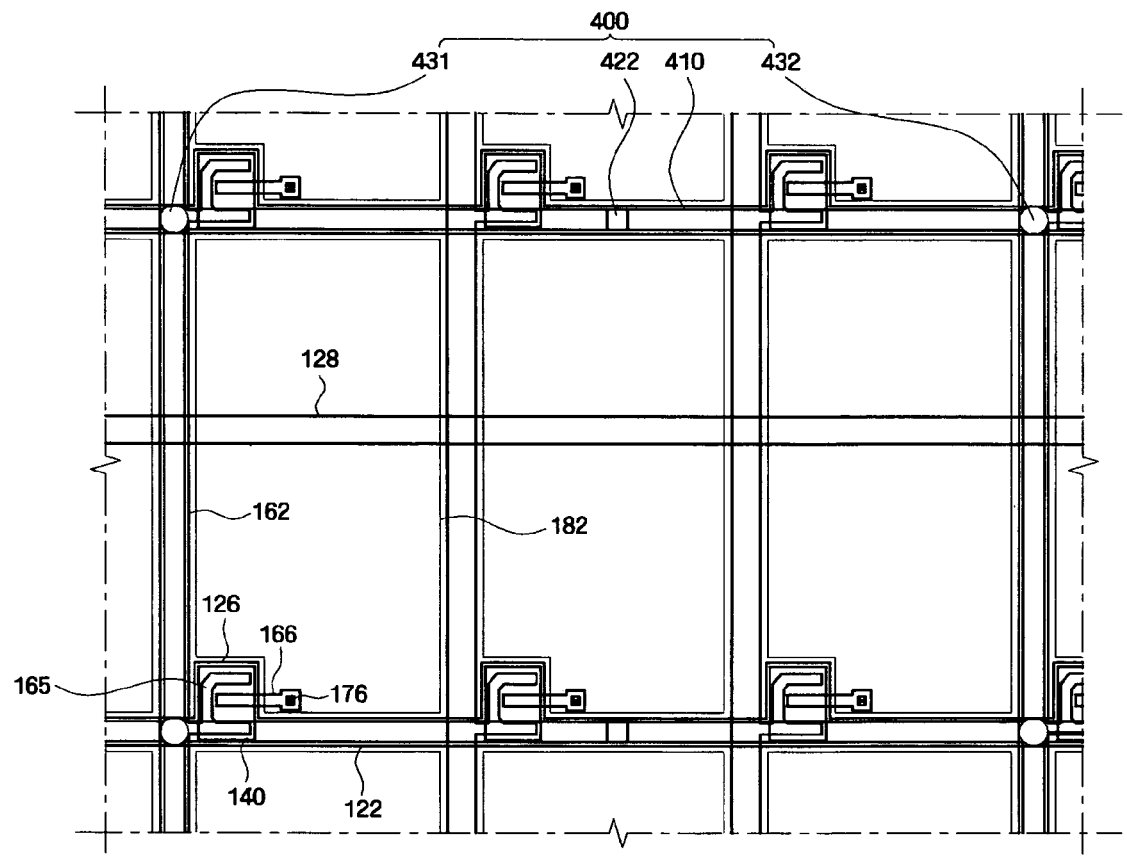
FIG. 23 is a plan view of the liquid crystal display panel according to an exemplary embodiment of the present invention.
Figure 24:
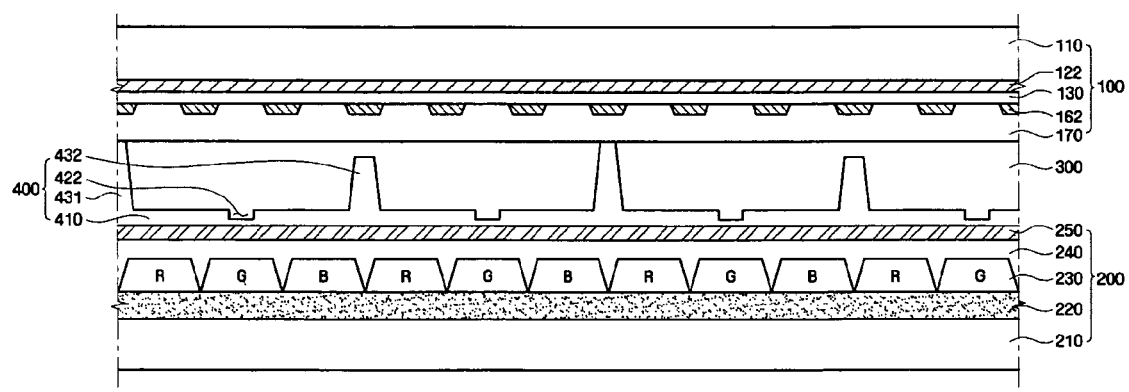
FIG. 24 is a longitudinal sectional view of the liquid crystal display panel according to an exemplary embodiment of the present invention.

In the liquid crystal display panel shown in FIGS. 22 through 24, a cell gap maintaining member 400 includes a connecting wall 410, a plurality of grooves 422 that are formed to a predetermined depth in the connecting wall 410, and a plurality of first and second protrusions 431 and 432 that protrude from the connecting wall 410 and have different heights. The depth of each of the grooves 422 is smaller than the height of the connecting wall 410. The depth of each of the grooves 422 can be varied according to the flow rate of liquid crystals provided that it is smaller than the height of the connecting wall 410. In an exemplary embodiment of the present invention, the depth of each of the grooves 422 is smaller than the height of the connecting wall 410, the connecting wall 410 can form a fully connected structure, and an external stress applied to the liquid crystal display panel can be effectively dispersed throughout the cell gap maintaining member 400. In addition, the grooves 422 can control a flow rate of liquid crystals toward a seal line 500, contact of the liquid crystal with an uncured seal line can be prevented, and contamination of liquid crystals and a defect due to a breakdown of the seal line 500 can be avoided.

The number and arrangement of the grooves 422 in the connecting wall 410 of the cell gap maintaining member 400 are not particularly limited. The number of the grooves 422 can be adjusted according to the flow rate of liquid crystals. The grooves 422 may be arranged randomly or uniformly.

The liquid crystal display panel according to the exemplary embodiment of the present invention described in connection with FIGS. 22 through 24 is substantially the same as the liquid crystal display panels according to the exemplary embodiments described in connection with FIGS. 1 through 3 and FIGS. 10 through 12 except that the cell gap maintaining member includes first and second protrusions of different heights and grooves with a smaller depth than the height of the connecting wall, and further description thereof will be omitted. The grooves of the exemplary embodiment of the present invention described in connection with FIGS. 22 through 24 can also be applied to the connecting wall of the cell gap maintaining member provided in the liquid crystal display panel according to the exemplary embodiment of the present invention shown in FIGS. 16 through 18.

Hereinafter, a method of manufacturing the liquid crystal display panel according to the exemplary embodiment of the present invention described in connection with FIGS. 1 through 3 will be described with reference to FIGS. 25 through 27, which are sectional views of intermediate structures formed during manufacturing of the liquid crystal display panel, together with FIGS. 1 through 3.

Figure 25:
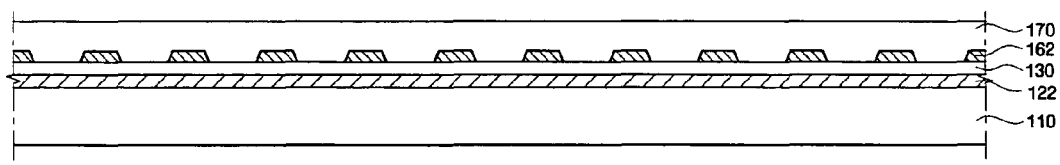
FIGS. 25 through 27 are sectional views of intermediate structures formed during manufacturing of the liquid crystal display panel according to an exemplary embodiment of the present invention.

As shown in FIG. 25, the thin film transistor and the passivation layer 170 are disposed on the first insulating substrate 110. An opaque conductive layer is first formed on the first insulating substrate 110 and patterned to form the gate lines 122, the gate electrode 126, and the storage electrode lines 128. The shape and arrangement of the storage electrode lines 128 can be varied. The gate insulating layer 130, the semiconductor layer 140, and ohmic contact layers (not shown) comprising n+ silicon are formed on the gate electrode 126. An opaque conductive layer is formed on the resultant structure and patterned to form the data lines 162, the source electrode 165, and the drain electrode 166.

Next, the passivation layer 170 is formed on the thin film transistor. For example, the passivation layer 170 may comprise a photosensitive organic material with good flatness characteristics, a low-dielectric insulating material, such as for example, a-Si:C:O or a-Si:O:F, or an inorganic material such as for example silicon nitride (SiNx), using plasma enhanced chemical vapor deposition (PECVD). The passivation layer 170 is partially removed to form the contact holes 176 exposing the source electrode 165. Then, a transparent conductive material, such as for example, indium tin oxide (ITO) or indium zinc oxide (IZO), is formed on the passivation layer 170 to form pixel electrode 182. The pixel electrode 182 is electrically connected to the source electrode 165 via the contact holes 176.

Figure 26:
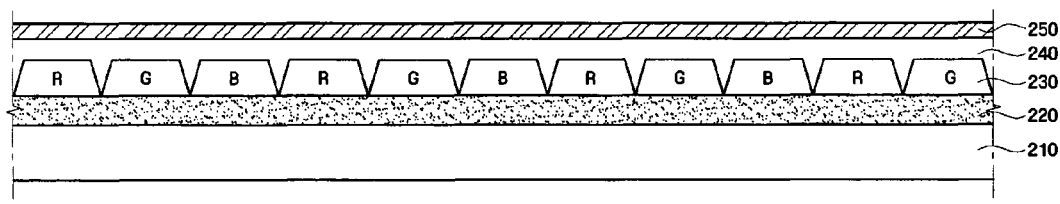

As shown in FIG. 26, a single- or multi-layered, light-blocking black opaque film is formed on a second insulating substrate 210 and patterned to form the black matrix 220. For example, the black matrix 220 may comprise a black pigment-containing organic photosensitive material. The black matrix 220 may be a single- or multi-layered film comprising one or more materials, such as for example, chromium (Cr), chromium oxide (CrO), and chromium nitride (CrNi). The black matrix 220 may be formed along the gate lines 122 and the data lines 162 in a lattice shape. The black matrix 220 may also be formed above a semiconductor layer (140 shown in FIG. 3) of the thin film transistor and may prevent light from coming into the semiconductor layer 140.

A red organic photosensitive material is coated on the black matrix 220 and etched using a photolithography process to form a red filter component. Then, green and blue filter components are formed in basically the same manner as the red filter component, to complete the color filter layer 230. The overcoating layer 240 comprising an organic photosensitive material, such as for example, an acrylic resin or a polyamide resin, is formed on the color filter layer 230. Then, the common electrode 250 is formed on the overcoating layer 240 comprising a transparent conductive material such as ITO or IZO. The common electrode 250, together with the pixel electrode 182 of the first substrate 100, can produce an electric field. Hereinafter, a manufacturing method of the cell gap maintaining member 400 according to an exemplary embodiment of the present invention will be described.

Figure 27:
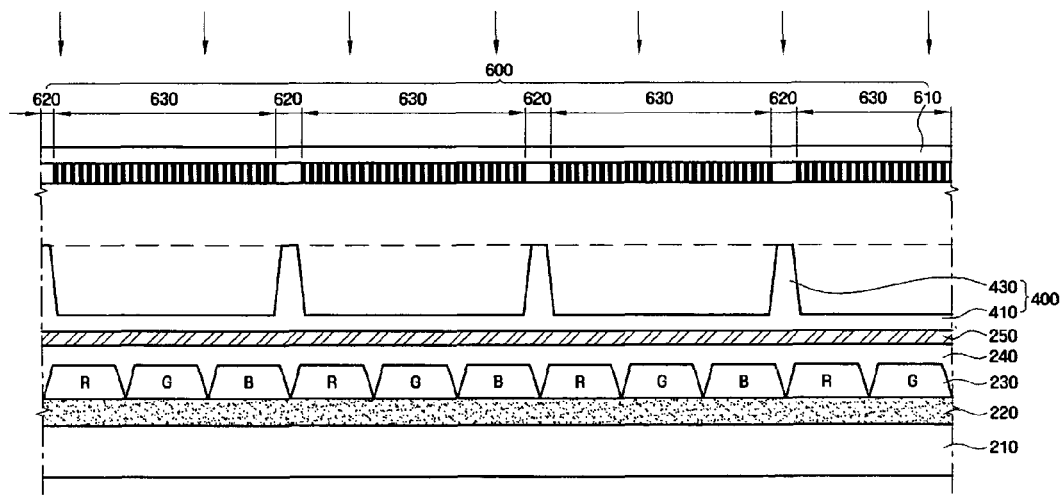

Referring to FIG. 27, an organic film (not shown) is formed to a predetermined thickness on the common electrode 250 of a second substrate (200 of FIG. 3). The organic film may comprise a negative photoresist whose unexposed regions are developed and removed. The organic film may comprise a positive photoresist whose exposed regions are developed and removed. The organic film may be formed to a thickness corresponding to a maximum height of a cell gap maintaining member 400 to be formed, which is referred to herein as a "target cell gap maintaining member".

Next, the organic film is patterned by photolithography, for example, using a slit mask 600, to form the cell gap maintaining member 400. The organic film may be patterned using a halftone mask.

In the case of the slit mask 600, the slit mask 600 is first positioned over the organic film. The slit mask 600 includes a transparent base 610 comprising quartz, etc., and an opaque slit pattern. The opaque slit pattern of the slit mask 600 may be a single- or multi-layered film comprising one or more of chromium and chromium oxide used as UV-blocking materials upon exposure to UV light.

The slit mask 600 includes a transmitting area 620 comprising the transparent base 610, a translucent area 630 that includes the transparent base 610 and the opaque slit pattern, and a light-shielding area (not shown). Here, the number and width of slits of the translucent area 630 may be varied. For example, the number and width of slits of the translucent area 630 can be adjusted according to exposure intensity.

The slit mask 600 has the transmitting area 620, the translucent area 630, and the light-shielding area arranged by the cell gap maintaining member 400, the light-shielding areas defined by the plurality of gate lines 122 and the plurality of data lines of the first substrate 100 and the black matrix 220 of the second substrate 200. For example, the transmitting area 620 of the slit mask 600 is disposed above portions of the organic film corresponding to protrusions 430 of the cell gap maintaining member 400, the translucent area 630 is disposed above a portion of the organic film corresponding to a connecting wall 410 of the cell gap maintaining member 400, and the light-shielding area is disposed above a portion of the organic film that is not intended for the formation of the cell gap maintaining member 400.

When the organic film is exposed to UV light through the slit mask 600, most of UV light is transmitted through the transmitting area 620 of the slit mask 600, and all of the portions of the organic film corresponding to the transmitting area 620 are substantially cured due to high exposure intensity. The translucent area 630 of the slit mask 600 allows UV light to be partially transmitted therethrough, and a portion of the organic film corresponding to the translucent area 630 is partially cured due to relatively low exposure intensity. The light-shielding area of the slit mask 600 blocks the transmission of UV light, and a portion of the organic film corresponding to the light-shielding area is substantially completely removed.

Next, when the exposed organic film is developed and baked, the cell gap maintaining member 400 composed of the connecting wall 410 and the protrusions 430 is completed. Here, the connecting wall 410 is formed to overlap with the light-shielding areas defined by the gate lines 122, the data lines 162, and the black matrix 220, and the protrusions 430 protrude from the connecting wall 410 in light-shielding areas corresponding to intersections between each of the gate lines 122 and each of the data lines 162.

Then, an alignment film (not shown) is formed on each of the first substrate 100 and the second substrate 200.

Then, as shown in FIGS. 1 through 3, the seal line 500 is formed on the first substrate 100 or the second substrate 200, liquid crystals are dispensed, and the first and second substrates 100 and 200 are incubated in a vacuum chamber to cure the seal line 500 to thereby complete the liquid crystal display panel.

Figure 28:
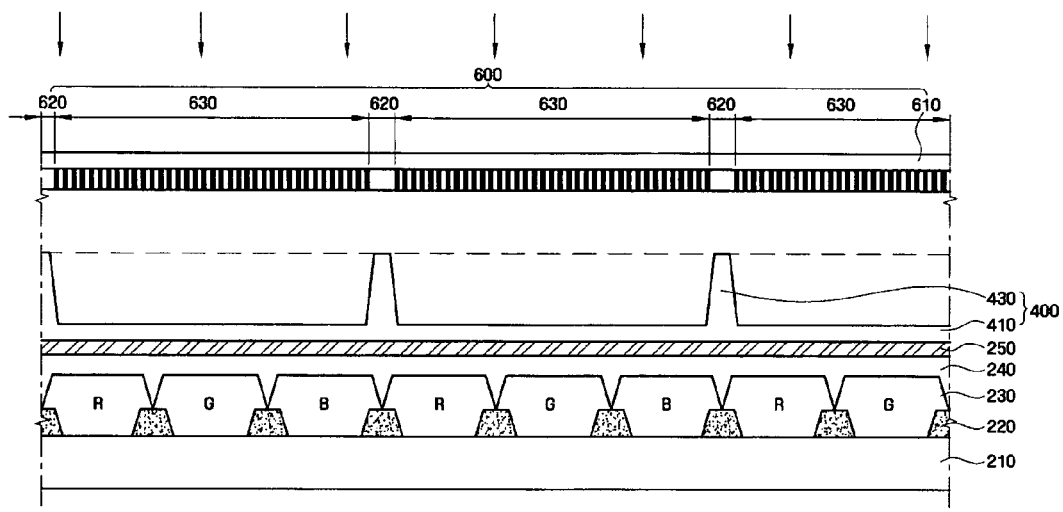
FIG. 28 is a sectional view of an intermediate structure formed during manufacturing of the liquid crystal display panel according to an exemplary embodiment of the present invention.

Hereinafter, a method of manufacturing the liquid crystal display panel according to the exemplary embodiment of the present invention described in connection with FIGS. 4 through 6 will be described with reference to FIG. 28, together with FIGS. 4 through 6. FIG. 28 is a sectional view of an intermediate structure formed during manufacturing of the liquid crystal display panel according to an exemplary embodiment of the present invention.

Referring to FIG. 28, together with FIGS. 4 through 6, the first substrate 100 and the second substrate 200 are first prepared in the same manner as in the manufacturing of the liquid crystal display panel according to the exemplary embodiment of the present invention described in connection with FIGS. 1 through 3 and FIGS. 25 through 27. An organic film (not shown) is formed to a predetermined thickness on a common electrode 250 of the second substrate 200. The organic film may be formed to a thickness corresponding to a maximum height of the target cell gap maintaining member 400.

Next, the slit mask 600 is positioned over the organic film. The slit mask 600 includes a transmitting area 620, a translucent area 630, and a light shielding area (not shown). The transmitting area 620, the translucent area 630, and the light shielding area are arranged so that the cell gap maintaining member 400 can overlap with light-shielding areas defined by the storage electrode lines 128 and the data lines 162 provided on the first substrate 100. For example, the transmitting area 620 of the slit mask 600 is disposed above portions of the organic film corresponding to protrusions 430 of the cell gap maintaining member 400, the translucent area 630 is disposed above a portion of the organic film corresponding to the connecting wall 410 of the cell gap maintaining member 400, and the light-shielding area is disposed above a portion of the organic film that is not intended for formation of the cell gap maintaining member 400.

The organic film is exposed to UV light through the slit mask 600, developed, and baked, and the cell gap maintaining member 400 comprising the connecting wall 410 and the protrusions 430 is completed. The connecting wall 410 is formed to overlap with light-shielding areas defined by the storage electrode lines 128 and the data lines 162, and the protrusions 430 are formed to protrude from the connecting wall 410 in light-shielding areas defined by the storage electrode lines 128.

Next, the same subsequent processes as in the manufacturing of the liquid crystal display panel according to the exemplary embodiment of the present invention described in connection with FIGS. 1 through 3 may be performed to complete the liquid crystal display panel as shown in FIGS. 4 through 6.

Figure 29:
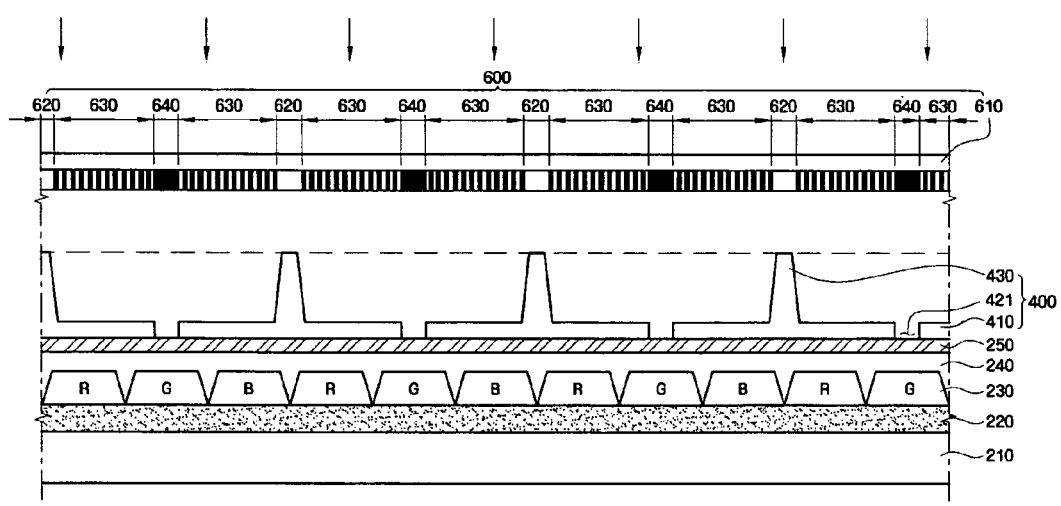
FIG. 29 is a sectional view of an intermediate structure formed during manufacturing of the liquid crystal display panel according to an exemplary embodiment of the present invention.

Hereinafter, a method of manufacturing the liquid crystal display panel according to the exemplary embodiment of the present invention described in connection with FIGS. 7 through 9 will be described with reference to FIG. 29, together with FIGS. 7 through 9. FIG. 29 is a sectional view of an intermediate structure formed during manufacturing of the liquid crystal display panel according to an exemplary embodiment of the present invention.

Referring to FIG. 29, together with FIGS. 7 through 9, the first substrate 100 and the second substrate 200 are prepared in the same manner as in the manufacturing of the liquid crystal display panel according to the exemplary embodiment of the present invention described in connection with FIGS. 1 through 3 and FIGS. 25 through 27. An organic film (not shown) is formed to a predetermined thickness on the common electrode 250 formed on the second substrate 200. The organic film may be formed to a thickness corresponding to a maximum height of the target cell gap maintaining member 400.

Next, a slit mask 600 is positioned over the organic film, as shown in FIG. 29. The slit mask 600 includes a transmitting area 620 composed of only a transparent base 610, a translucent area 630 composed of the transparent base 610 and an opaque slit pattern, a first light-shielding area 640 composed of the transparent base 610 and an opaque film, and a second light-shielding area (not shown). The translucent area 630 of the slit mask 600 is used for formation of the connecting wall 410 of the cell gap maintaining member 400, and the transparent area 620 is used for formation of protrusions 430 protruding from the connecting wall 410 of the cell gap maintaining member 400. The first light-shielding area 640 and the second light-shielding area of the slit mask 600 are respectively used for formation of grooves 421 in the connecting wall 410 and for removal of a portion of the organic film that is not intended for formation of the cell gap maintaining member 400. The grooves 421 serve to adjust the flow rate of liquid crystals. The dimension of the first light-shielding area 640 of the slit mask 600 is adjusted so that the depth of the grooves 421 is substantially the same as the height of the connecting wall 410.

The organic film is exposed to UV light through the slit mask 600, developed, and baked, and the cell gap maintaining member 400 comprising the connecting wall 410, the protrusions 430, and the grooves 421 is completed. The connecting wall 410 is formed to overlap with light-shielding areas defined by the gate lines 122, the data lines 162, and the black matrix 220, the protrusions 430 are formed to protrude from the connecting wall 410 in light-shielding areas corresponding to intersections between each of the gate lines 122 and each of the data lines 162, and the grooves 421 are formed to substantially the same depth as the height of the connecting wall 410 in the connecting wall 410. The formation of the grooves 421 in the connecting wall 410 of the cell gap maintaining member 400 can also be applied to the manufacturing of the liquid crystal display panel according to the exemplary embodiment of the present invention described in connection with FIGS. 4 through 6.

Next, the same subsequent processes as in the manufacturing of the liquid crystal display panel according to the exemplary embodiment of the present invention described in connection with FIGS. 1 through 3 may be performed to complete the liquid crystal display panel as shown in FIGS. 7 through 9.

Figure 30:
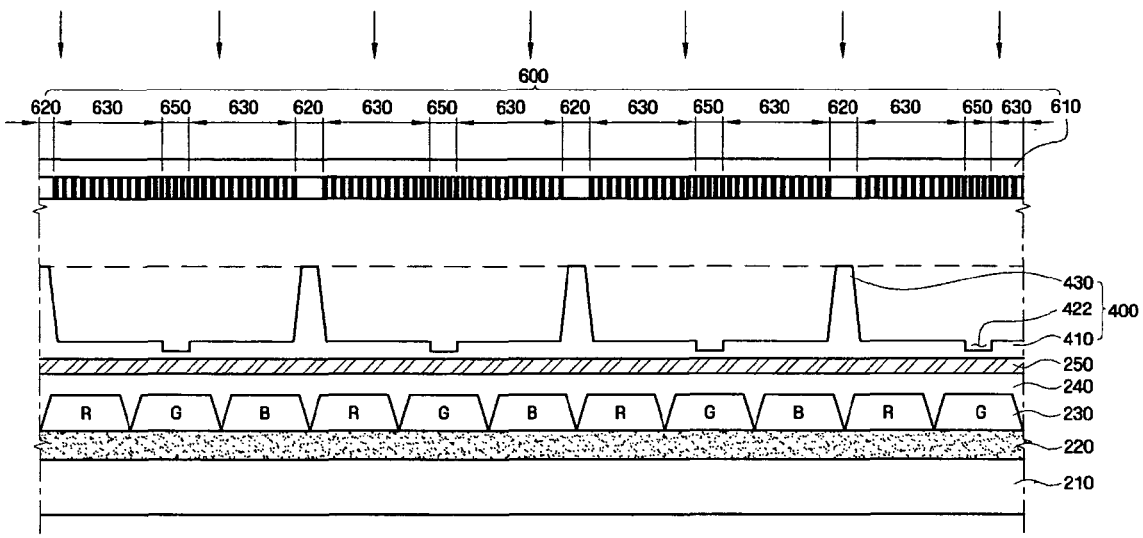
FIG. 30 is a sectional view of an intermediate structure formed during manufacturing of a liquid crystal display panel according to an exemplary embodiment of the present invention.

Hereinafter, a method of manufacturing the liquid crystal display panel according to the exemplary embodiment of the present invention described in connection with FIGS. 10 through 12 will be described with reference to FIG. 30, together with FIGS. 10 through 12. FIG. 30 is a sectional view of an intermediate structure formed during manufacturing of the liquid crystal display panel according to an exemplary embodiment of the present invention.

Referring to FIG. 30, together with FIGS. 10 through 12, the first substrate 100 and the second substrate 200 are prepared in the same manner as in the manufacturing of the liquid crystal display panel according to the exemplary embodiment of the present invention described in connection with FIGS. 1 through 3. An organic film (not shown) is formed to a predetermined thickness on the common electrode 250 of the second substrate 200. The organic film may be formed to a thickness corresponding to a maximum height of the target cell gap maintaining member 400.

As shown in FIG. 30, the slit mask 600 is positioned over the organic film. The slit mask 600 includes a transmitting area 620 composed of only a transparent base 610, a first translucent area 630 composed of the transparent base 610 and an opaque film including slit pattern with a first slit width, a second translucent area 650 composed of the transparent base 610 and an opaque film including slit pattern with a second slit width smaller than the first slit width, and a light-shielding area (not shown) composed of a transparent base and an opaque film. The first translucent area 630 of the slit mask 600 is used for formation of the connecting wall 410 of the cell gap maintaining member 400, and the transmitting area 620 is used for formation of protrusions 430 protruding from the connecting wall 410 of the cell gap maintaining member 400. The second translucent area 650 of the slit mask 600 is used for formation of the grooves 422 in the connecting wall 410 of the cell gap maintaining member 400. The grooves 422 serve to adjust the flow rate of liquid crystals. The second slit width of the second translucent area 650 of the slit mask 600 is adjusted so that the depth of the grooves 422 is smaller than the height of the connecting wall 410.

The organic film is exposed to UV light through the slit mask 600, developed, and baked, and the cell gap maintaining member 400 comprising the connecting wall 410, the protrusions 430, and the grooves 422 is completed. The connecting wall 410 is formed to overlap with the light-shielding areas defined by the gate lines 122, the data lines 162, and the black matrix 220, the protrusions 430 protrude from the connecting wall 410 in light-shielding areas corresponding to intersections of the gate lines 122 and the data lines 162, and the grooves 422 are formed to a smaller depth than the height of the connecting wall 410. The formation of the grooves 422 in the connecting wall 410 of the cell gap maintaining member 400 can also be applied to the manufacturing of the liquid crystal display panel according to the exemplary embodiment of the present invention described in connection with FIGS. 4 through 6.

Next, the same subsequent processes as in the manufacturing of the liquid crystal display panel according to the exemplary embodiment of the present invention described in connection with FIGS. 1 through 3 may be performed to complete the liquid crystal display panel, as shown in FIGS. 10 through 12.

Figure 31:
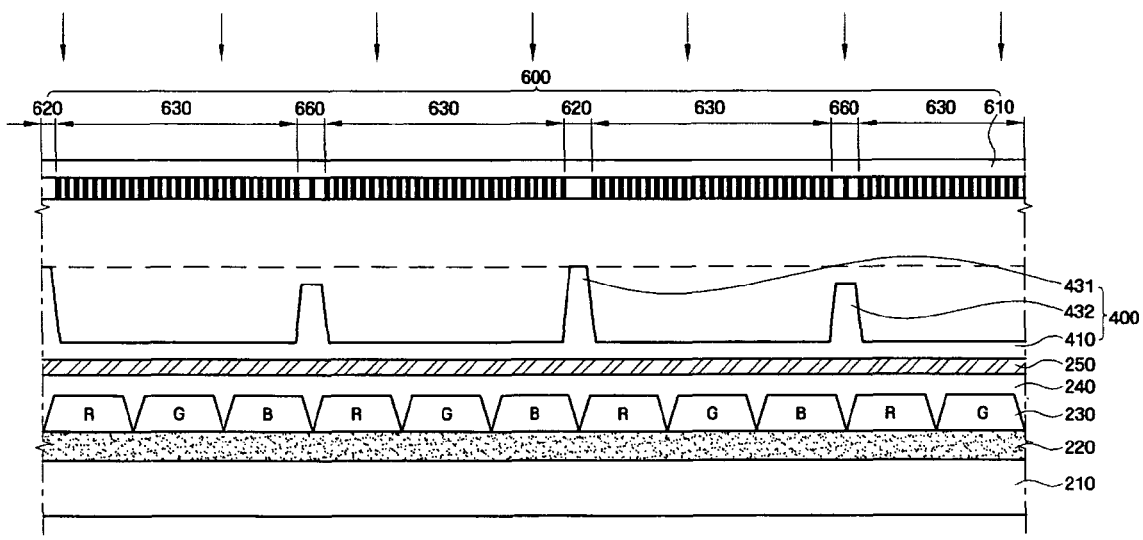
FIG. 31 is a sectional view of an intermediate structure formed during manufacturing of the liquid crystal display panel according to an exemplary embodiment of the present invention.

Hereinafter, a method of manufacturing the liquid crystal display panel according to the exemplary embodiment of the present invention described in connection with FIGS. 13 through 15 will be described with reference to FIG. 31, together with FIGS. 13 through 15 with regard to differences between the manufacturing methods according to the embodiment described in connection with FIGS. 1 through 3 and FIGS. 25-27 and the present exemplary embodiment, for descriptive convenience. FIG. 31 is a sectional view of an intermediate structure formed during manufacturing of the liquid crystal display panel according to an exemplary embodiment of the present invention.

Referring to FIG. 31, the first substrate 100 and the second substrate 200 are first prepared in the same manner as in the manufacturing of the liquid crystal display panel according to the exemplary embodiment of the present invention described in connection with FIGS. 1 through 3. An organic film (not shown) is formed to a predetermined thickness on the common electrode 250 of the second substrate 200. The organic film may be formed to a thickness corresponding to a maximum height of the target cell gap maintaining member 400.

Next, the slit mask 600 is positioned over the organic film. The slit mask 600 includes the transmitting area 620 composed of only a transparent base 610, the first translucent area 630 composed of the transparent base 610 and an opaque film including slit pattern with a first slit width, a third translucent area 660 composed of the transparent base 610 and an opaque film including slit pattern with a third slit width greater than the first slit width, and a light-shielding area (not shown) composed of the transparent base 610 and an opaque film. The first translucent area 630 of the slit mask 600 is used for formation of the connecting wall 410 of the cell gap maintaining member 400, and the transmitting area 620 is used for formation of first protrusions 431 that protrude from the connecting wall 410 of the cell gap maintaining member 400 and have a first height. The third translucent area 660 of the slit mask 600 is used for formation of second protrusions 432 that protrude from the connecting wall 410 of the cell gap maintaining member 400 and have a second height smaller than the first height, and the light-shielding area is used for removal of a portion of the organic film cell that is not intended for formation of the cell gap maintaining member 400.

When the organic film is exposed to UV light through the slit mask 600, developed, and baked, the cell gap maintaining member 400 composed of the connecting wall 410, and the first and second protrusions 431 and 432 is completed. The connecting wall 410 is formed to overlap with light-shielding areas defined by the gate lines 122, the data lines 162, and the black matrix 220, and the first and second protrusions 431 and 432 of different heights are alternately formed to protrude from the connecting wall 410 in the light-shielding areas corresponding to an intersection between each of the gate lines 122 and each of the plurality of data lines 162.

Next, the same subsequent processes as in the manufacturing of the liquid crystal display panel according to the exemplary embodiment of the present invention described in connection with FIGS. 1 through 3 may be performed to complete the liquid crystal display panel as shown in FIGS. 13 through 15.

Figure 32:
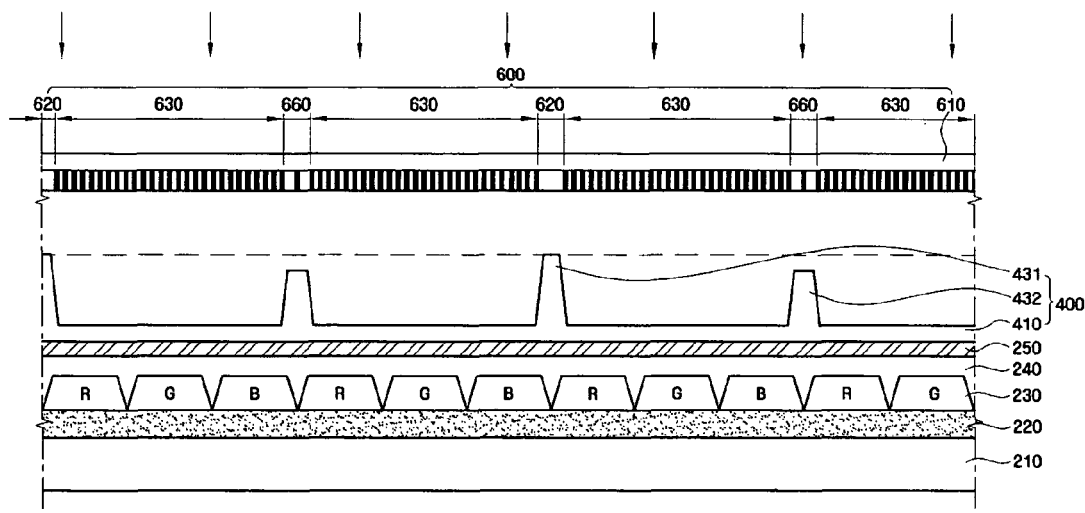
FIG. 32 is a sectional view of an intermediate structure formed during manufacturing of the liquid crystal display panel according to an exemplary embodiment of the present invention.

Hereinafter, a method of manufacturing the liquid crystal display panel according to an exemplary embodiment of the present invention will be described with reference to FIG. 32, together with FIGS. 16 through 18 with regard to differences between the manufacturing methods according to the exemplary embodiments of the present invention described in connection with FIGS. 1 through 6 and FIGS. 13-15 and the present embodiment, for descriptive convenience. FIG. 32 is a sectional view of an intermediate structure formed during manufacturing of the liquid crystal display panel according to an exemplary embodiment of the present invention.

First, the first substrate 100 and the second substrate 200 are prepared in the same manner as in the manufacturing of the liquid crystal display panel according to the exemplary embodiment of the present invention described in connection with FIGS. 1 through 3. An organic film (not shown) is formed to a predetermined thickness on the common electrode 250 of the second substrate 200. The organic film may be formed to a thickness corresponding to a maximum height of the target cell gap maintaining member 400.

Next, as shown in FIG. 32, a slit mask 600 is positioned over the organic film. The slit mask 600 includes a transmitting area 620, first and third translucent areas 630 and 660, and a light-shielding area (not shown). The transmitting area 620, the first and third translucent areas 630 and 660, and the light-shielding area are arranged so that the cell gap maintaining member 400 can overlap with the light-shielding areas defined by the storage electrode line 128 and the data lines 162 of the first substrate 100. For example, the transmitting area 620 of the slit mask 600 is disposed above portions of the organic film corresponding to the first protrusions 431 protruding from the connecting wall 410 of the cell gap maintaining member 400, the first translucent area 630 is disposed above a portion of the organic film corresponding to the connecting wall 410 of the cell gap maintaining member 400, the third translucent area 660 is disposed above portions of the organic film corresponding to the second protrusions 432 protruding from the connecting wall 410 of the cell gap maintaining member 400, and the light-shielding area is disposed above a portion of the organic film that is not intended for formation of the cell gap maintaining member 400.

The organic film is exposed to UV light through the slit mask 600, developed, and baked, and the cell gap maintaining member 400 comprising the connecting wall 410, and the first and second protrusions 431 and 432 is completed. The connecting wall 410 is formed to overlap with the light-shielding areas defined by the storage electrode line 128 and the plurality of data lines 162, and the first and second protrusions 431 and 432 are alternately formed to protrude from the connecting wall 410 in the light-shielding area defined by the storage electrode line 128.

Next, the same subsequent processes as in the manufacturing of the liquid crystal display panel according to the exemplary embodiment of the present invention described in connection with FIGS. 1 through 3 may be performed to complete the liquid crystal display panel as shown in FIGS. 16 through 18.

Figure 33:
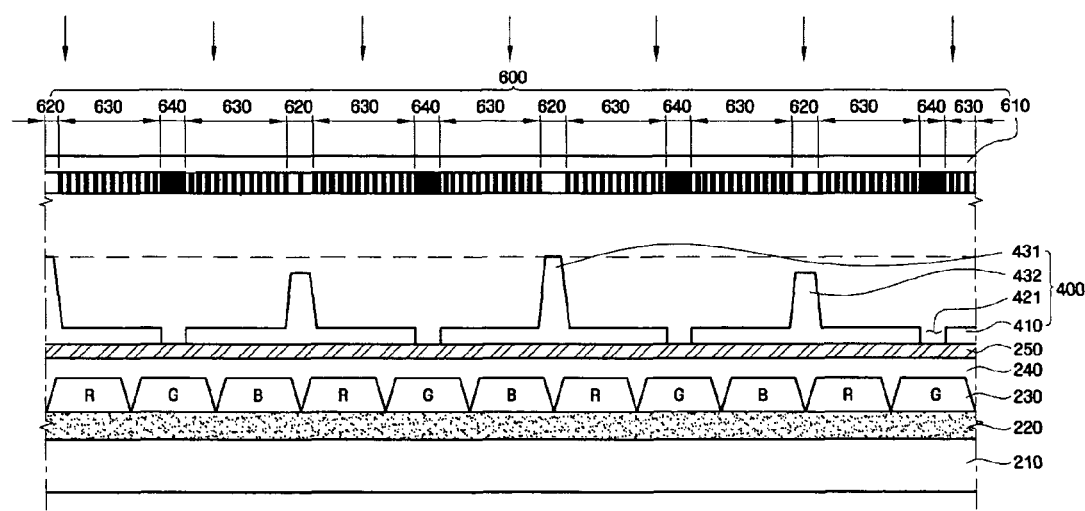
FIG. 33 is a sectional view of an intermediate structure formed during manufacturing of the liquid crystal display panel according to an exemplary embodiment of the present invention.

Hereinafter, a method of manufacturing the liquid crystal display panel according to an exemplary embodiment of the present invention will be described with reference to FIG. 33, together with FIGS. 19 through 21. FIG. 33 is a sectional view of an intermediate structure formed during manufacturing of the liquid crystal display panel according to an exemplary embodiment of the present invention.

The first substrate 100 and the second substrate 200 are first prepared in the same manner as in the manufacturing of the liquid crystal display panel according to the exemplary embodiment of the present invention described in connection with FIGS. 1 through 3. An organic film (not shown) is formed to a predetermined thickness on the common electrode 250 of the second substrate 200. The organic film may be formed to a thickness corresponding to a maximum height of the target cell gap maintaining member 400.

Next, a slit mask 600 is positioned over the organic film. The slit mask 600 includes a transmitting area 620 composed of only a transparent base 610, a first translucent area 630 composed of the transparent base 610 and an opaque slit pattern with a first slit width, a third translucent area 660 composed of the transparent base 610 and an opaque slit pattern with a third slit width greater than the first slit width, a first light-shielding area 640 composed of the transparent base 610 and an opaque film, and a second light-shielding area (not shown). The first translucent area 630 of the slit mask 600 is used for formation of the connecting wall 410 of the cell gap maintaining member 400, the transmitting area 620 is used for formation of first protrusions 431 that protrude from the connecting wall 410 of the cell gap maintaining member 400 and have a first height, and the third translucent area 660 is used for formation of the second protrusions 432 that protrude from the connecting wall 410 of the cell gap maintaining member 400 and have a second height smaller than the first height. The first light-shielding area 640 of the slit mask 600 is used for formation of the grooves 421 in the connecting wall 410 of the cell gap maintaining member 400, and the second light-shielding area is used for removal of a portion of the organic film that is not intended for the formation of the cell gap maintaining member 400.

The organic film is exposed to UV light through the slit mask 600, developed, and baked, and the cell gap maintaining member 400 comprising the connecting wall 410, the first and second protrusions 431 and 432, and the grooves 421 is completed. The connecting wall 410 is formed to overlap with the light-shielding areas defined by the gate lines 122, the data lines 162, and the black matrix 220, the first and second protrusions 431 and 432 of different heights are formed to protrude from the connecting wall 410 in light-shielding areas corresponding to intersections between each of the plurality of gate lines 122 and each of the lines 162, and the grooves 421 are formed to substantially the same depth as the height of the connecting wall 410 in the connecting wall 410. The formation of the grooves 421 in the connecting wall 410 of the cell gap maintaining member 400 can also be applied to the manufacturing of the liquid crystal display panel according to the exemplary embodiment of the present invention described in connection with FIGS. 16 through 18.

Next, the same subsequent processes as in the manufacturing of the liquid crystal display panel according to the exemplary embodiment of the present invention described in connection with FIGS. 1 through 3 may be performed to complete the liquid crystal display panel as shown in FIGS. 19 through 21.

Figure 34:
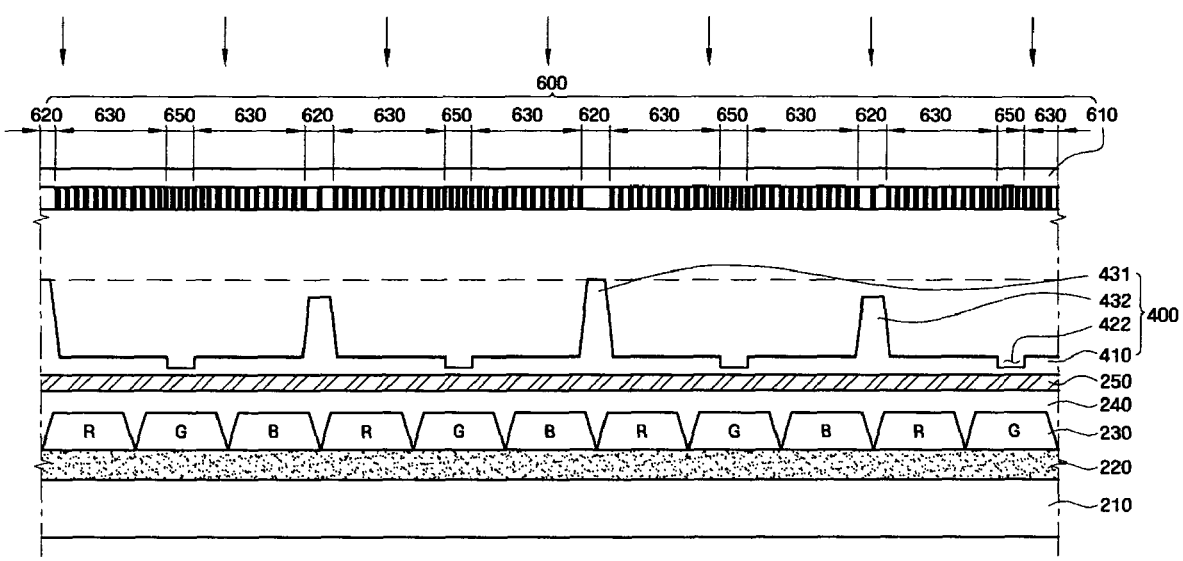
FIG. 34 is a sectional view of an intermediate structure formed during manufacturing of the liquid crystal display panel according to an exemplary embodiment of the present invention.

Hereinafter, a method of manufacturing the liquid crystal display panel according to the exemplary embodiment of the present invention described in connection with FIGS. 22 through 24 will be described with reference to FIG. 34, together with FIGS. 22 through 24. FIG. 34 is a sectional view of an intermediate structure formed during manufacturing of the liquid crystal display panel according to the exemplary embodiment of the present invention described in connection with FIGS. 22 through 24.

First, the first substrate 100 and the second substrate 200 are prepared in the same manner as in the manufacturing of the liquid crystal display panel according to the exemplary embodiment of the present invention described in connection with FIGS. 1 through 3. An organic film (not shown) is formed to a predetermined thickness on the common electrode 250 of the second substrate 200. The organic film may be formed to a thickness corresponding to a maximum height of the target cell gap maintaining member 400.

Next, the slit mask 600 is positioned over the organic film. The slit mask 600 includes a transmitting area 620 composed of only a transparent base 610, a first translucent area 630 composed of the transparent base 610 and an opaque slit pattern with a first slit width, a second translucent area 650 composed of the transparent base 610 and an opaque slit pattern with a second slit width smaller than the first width, a third translucent area 660 composed of the transparent base 610 and an opaque slit pattern with a third slit width greater than the first slit width, and a light-shielding area (not shown). The first translucent area 630 of the slit mask 600 is used for formation of the connecting wall 410 of the cell gap maintaining member 400, and the transmitting area 620 is used for formation of the first protrusions 431 protruding from the connecting wall 410 of the cell gap maintaining member 400. The second translucent area 650 of the slit mask 600 is used for formation of the grooves 422 in the connecting wall 410 of the cell gap maintaining member 400, and the third translucent member 660 is used for formation of second protrusions 432 protruding from the connecting wall 410 of the cell gap maintaining member 400. The light-shielding area is used for removal of a portion of the organic film that is not intended for formation of the cell gap maintaining member 400. The grooves 422 serve to adjust the flow rate of liquid crystals. The second slit width of the second translucent area 650 of the slit mask 600 is adjusted such that the depth of the grooves 422 is smaller than the height of the connecting wall 410.

The organic film is exposed to UV light through the slit mask 600, developed, and baked, and the cell gap maintaining member 400 comprising the connecting wall 410, the first and second protrusions 431 and 432, and the grooves 422 is completed. The connecting wall 410 is formed to overlap with light-shielding areas defined by gate lines 122, data lines 162, and the black matrix 220, and the first and second protrusions 431 and 432 of different heights are alternately formed to protrude from the connecting wall 410 in light-shielding areas corresponding to intersections between each of the gate lines 122 and each of the lines 162. The grooves 422 are formed to a smaller depth than the height of the connecting wall 410 in the connecting wall 410. The formation of the grooves 422 in the connecting wall 410 of the cell gap maintaining member 400 can also be applied to the manufacturing of the liquid crystal display panel according to the exemplary embodiment of the present invention described in connection with FIGS. 16 through 18.

Next, the same subsequent processes as in the manufacturing of the liquid crystal display panel according to the exemplary embodiment of the present invention described in connection with FIGS. 1 through 3 may be performed to complete the liquid crystal display panel as shown in FIGS. 22 through 24.

Although the above-described liquid crystal display panels in accordance with the exemplary embodiments of the present invention do not include cutouts or protrusion patterns in a pixel electrode or a common electrode, it is to be understood that cell gap maintaining members according to exemplary embodiments of the present invention can be applied to liquid crystal display panels wherein cutouts or protrusion patterns are included in a pixel electrode or a common electrode.

Although in above-described liquid crystal display panels according to exemplary embodiments of the present invention include a pixel electrode and a common electrode respectively disposed on a first substrate and a second substrate, it is to be understood that the cell gap maintaining members according to exemplary embodiments of the present invention can be applied to liquid crystal display panels wherein a pixel electrode and a common electrode are disposed on the same panel.

Although in above-described liquid crystal display panels according to exemplary embodiments of the present invention include a cell gap maintaining member which is attached to a second substrate it is to be understood that said cell gap maintaining member may be attached to the first substrate.

Although in above-described exemplary embodiments of the present invention a semiconductor layer and a data line are formed using different photolithography processes, a semiconductor layer and a data line are formed using a single photolithography process.

Although in above-described an exemplary embodiments of the present invention a connecting wall and protrusions of a cell gap maintaining member are formed using a single photolithography process, a cell gap maintaining member can also be completed in such a manner that a connecting wall is formed by patterning an organic film using a photolithography process, and separately formed protrusions are attached to the connecting wall, wherein protrusions filled in grooves of a printing plate can be transferred to a connecting wall using a transfer roller or a transfer plate.

As described above, according to exemplary embodiments of the present invention, a stress applied to a liquid crystal display panel can be efficiently dispersed while ensuring a sufficient liquid crystal dispensing margin.

Although the exemplary embodiments of the present invention have been described in detail with reference to the accompanying drawings for the purpose of illustration, it is to be understood that the inventive processes and apparatus should not be construed as limited thereby. It will be readily apparent to those of reasonable skill in the art that various modifications to the foregoing exemplary embodiments may be made without departing from the scope of the invention as defined by the appended claims, with equivalents of the claims to be included therein.

What is claimed is:
1. A liquid crystal display panel comprising:
   a first substrate including a gate line, a data line crossing the gate line, and an insulating layer interposed between the gate line and the data line, defining a pixel, and a thin film transistor disposed at the pixel and a storage electrode line;

a second substrate facing the first substrate and including a black matrix; and a cell gap maintaining member disposed between the first substrate and the second substrate and including a connecting wall attached to either the first substrate or the second substrate, and a plurality of protrusions protruding from the connecting wall, wherein the connecting wall overlaps with at least one of the gate line, the data line, the thin film transistor, the storage electrode line or the black matrix, and a width of the connecting wall is less than or equal to a width of each of the gate line, the data line, the thin film transistor, the storage electrode line or the black matrix overlapping the connecting wall, and wherein the connecting wall includes one or more grooves overlapping at least one of the gate line or the data line.

2. The liquid crystal display panel of claim 1, wherein a depth of each of the one or more grooves is less than or equal to a height of the connecting wall.

3. The liquid crystal display panel of claim 2, wherein the plurality of the protrusions includes a first protrusion and a second protrusion having a different height than a height of the first protrusion.

4. The liquid crystal display panel of claim 3, wherein the first or second protrusions contact either the first substrate or the second substrate.

* * * * *